US009646450B2

(12) United States Patent
Melik-Aslanian et al.

(10) Patent No.: US 9,646,450 B2
(45) Date of Patent: May 9, 2017

(54) EMERGENCY FUND AND REPLACEMENT OF CREDIT/DEBIT CARDS—LOST, STOLEN, DEFECTIVE OR FRAUDULENTLY USED

(76) Inventors: Stefan Melik-Aslanian, New York, NY (US); Linda Malek-Aslanian, New York, NY (US)

( * ) Notice: Subject to any disclaimer, the term of this patent is extended or adjusted under 35 U.S.C. 154(b) by 794 days.

(21) Appl. No.: 12/725,194

(22) Filed: Mar. 16, 2010

(65) Prior Publication Data

US 2010/0174639 A1    Jul. 8, 2010

Related U.S. Application Data

(63) Continuation-in-part of application No. 12/575,692, filed on Oct. 8, 2009, which is a continuation-in-part of application No. 12/393,041, filed on Feb. 26, 2009.

(60) Provisional application No. 61/068,607, filed on Mar. 8, 2008.

(51) Int. Cl.
*G06Q 20/00*  (2012.01)
*G07F 7/02*  (2006.01)
*G06Q 20/34*  (2012.01)
*G06Q 40/02*  (2012.01)
*G07F 7/12*  (2006.01)

(52) U.S. Cl.
CPC ............ *G07F 7/025* (2013.01); *G06Q 20/00* (2013.01); *G06Q 20/342* (2013.01); *G06Q 20/354* (2013.01); *G06Q 20/3572* (2013.01); *G06Q 40/02* (2013.01); *G06Q 40/025* (2013.01); *G07F 7/12* (2013.01)

(58) Field of Classification Search
CPC ... G06Q 20/354; G06Q 20/342; G06Q 20/347

USPC ........................................................ 705/38
See application file for complete search history.

(56) References Cited

U.S. PATENT DOCUMENTS

| 7,392,945 B1 * | 7/2008 | Philyaw ........................ 235/383 |
| 2004/0117300 A1 * | 6/2004 | Jones et al. ..................... 705/39 |
| 2005/0182802 A1 * | 8/2005 | Beaudou et al. ............. 708/200 |
| 2006/0259390 A1 * | 11/2006 | Rosenberger ................... 705/35 |

(Continued)

FOREIGN PATENT DOCUMENTS

WO        WO 0135355 A1 *  5/2001

OTHER PUBLICATIONS

Office of the Comptroller of the Currency Board of Governors of the Federal Reserve System Federal Deposit Insurance Corporation National Credit Union Administration Joint Guidance on Overdraft Protection Programs Feb. 18, 2005 www.federalreserve.gov/board-docs/SRLETTERS/2005/SR0503a1.pdf.*

(Continued)

*Primary Examiner* — Mohammad Z Shaikh
*Assistant Examiner* — Mary Gregg
(74) *Attorney, Agent, or Firm* — Israel Nissenbaum; Yitzy Nissenbaum

(57) ABSTRACT

A credit card Emergency Fund system, comprising the steps of a credit card provider opening one or two accounts with two different card numbers, with a first "main credit card" and a second credit card for a spare. Alternatively, one credit card is provided with one or two accounts. Upon the customer's request, when the credit limit of the main credit card is fully expended, the spare credit card, with the Emergency credit line, or the Emergency credit line with a single card, is activated for a limited time period.

8 Claims, 9 Drawing Sheets

(56) References Cited

U.S. PATENT DOCUMENTS

2007/0164098 A1\* 7/2007 Khalid et al. .................. 235/380
2007/0203853 A1\* 8/2007 Gindi ............................... 705/80
2010/0044442 A1\* 2/2010 Phillips ......................... 235/488

OTHER PUBLICATIONS

Smart Cards; by Jan De Clercq; Dec. 22, 2008; 20 pages ; technet.microsoft.com/en-us/library/dd277362.aspx.\*
Freeman, Lisa, "Immediate check Card Issuance is an Immediate Hit"; May 2008; Credit Union Journal; 1 page.\*

\* cited by examiner

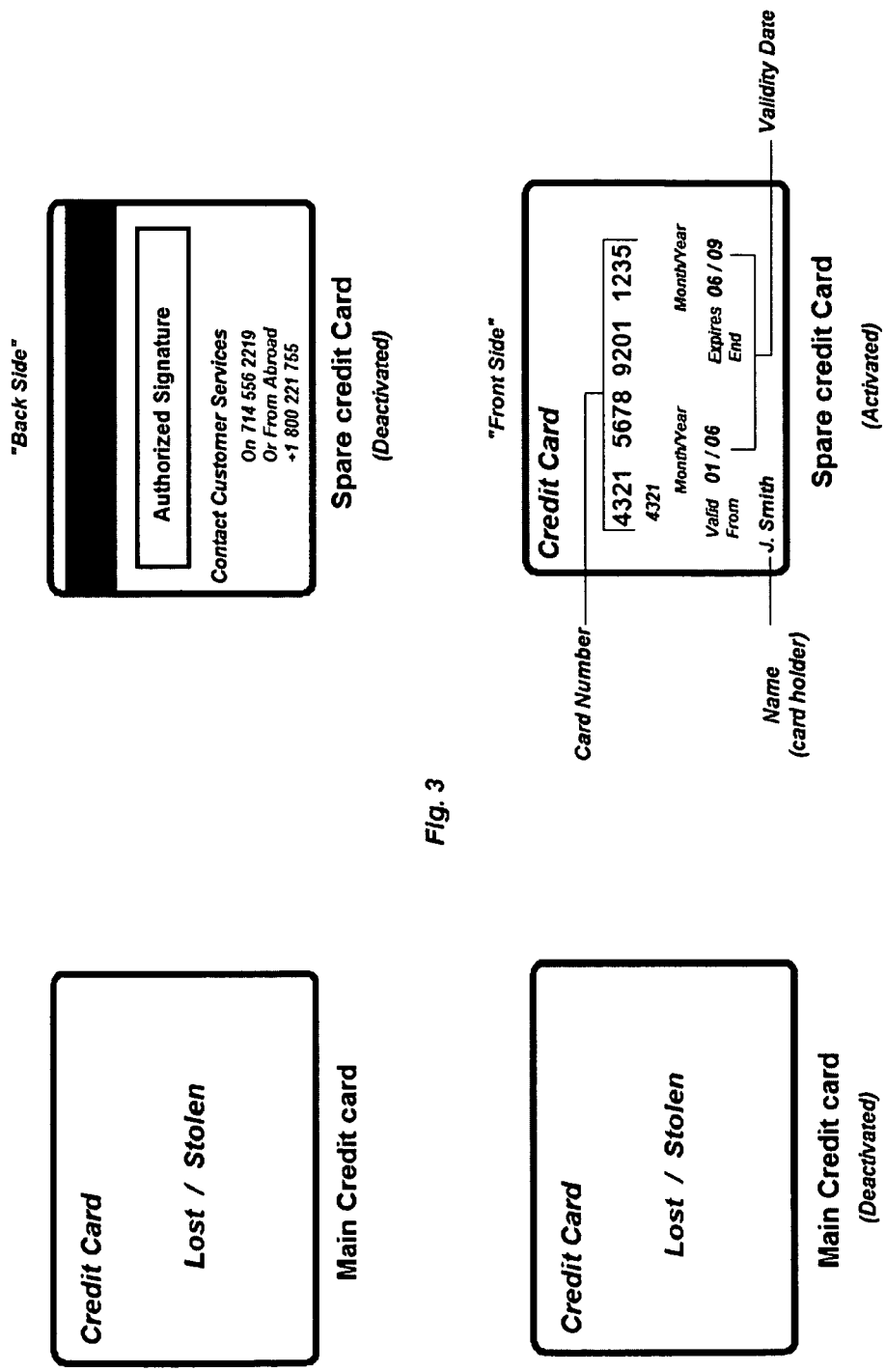

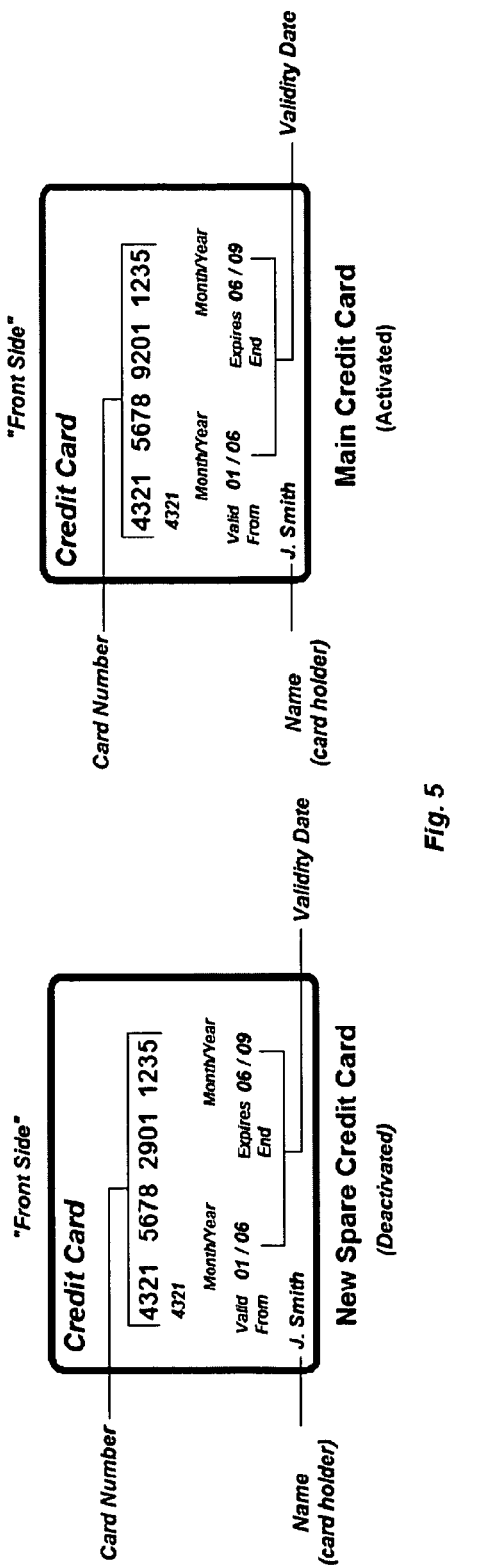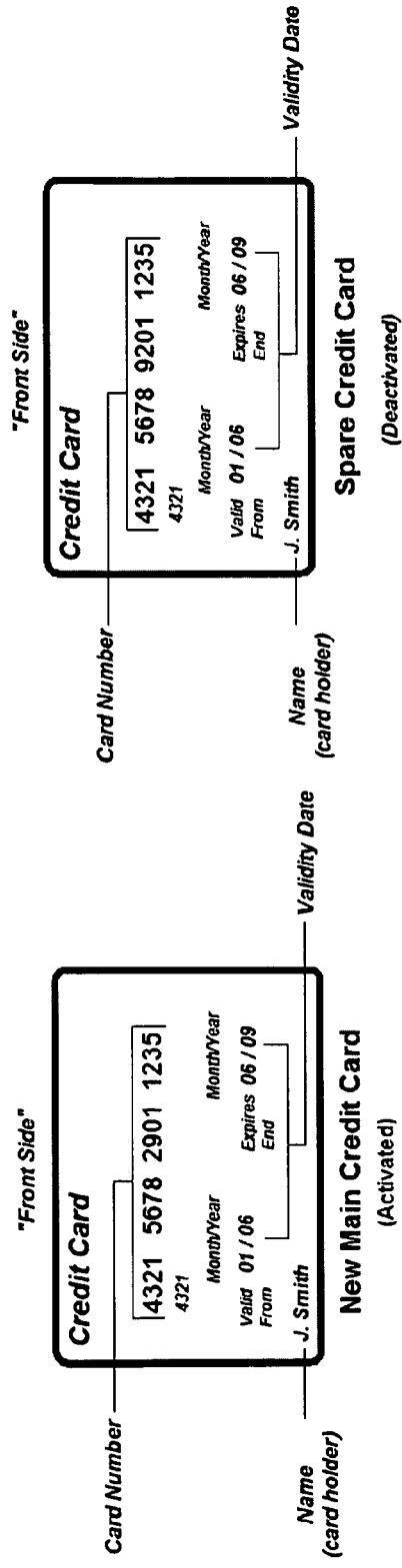
Fig. 5
Fig. 5A

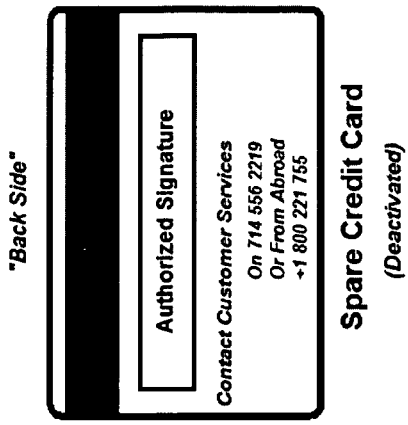
Fig. 9
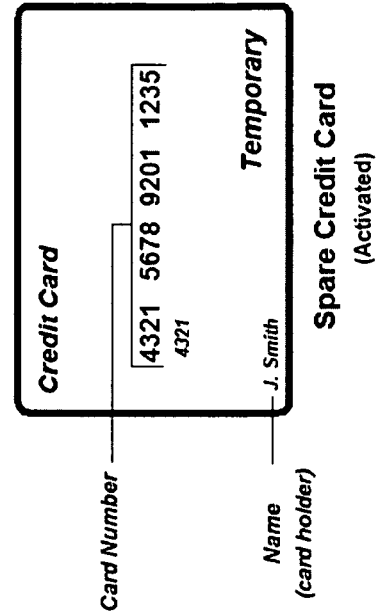
Fig. 10
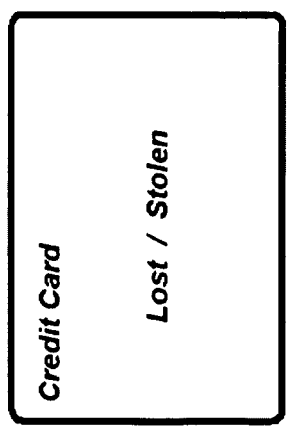
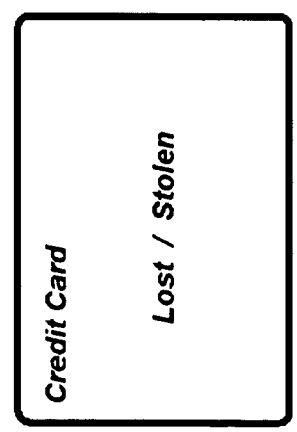

EMERGENCY FUND AND REPLACEMENT OF CREDIT/DEBIT CARDS—LOST, STOLEN, DEFECTIVE OR FRAUDULENTLY USED

BACKGROUND

1. Field of the Invention

The present invention relates to credit/debit cards, and more specifically, a method and system offering immediate replacement of lost or stolen credit/debit cards.

2. Related Art

The potential for fraud in case a credit/debit card is lost or stolen has been a major concern for the credit card companies and financial institutions as well as the customers and the providers of the goods and services. Hereinafter, reference to "credit" cards, unless otherwise noted, encompasses both credit and debit cards. There have been many developments in an effort to overcome this fundamental problem of fraud. The credit card companies have an efficient credit card fraud protection system which is working well to block a lost or stolen credit card. The credit card companies also have an efficient credit card replacement system which has been working well to issue and send a new credit card to the customer in case their card has been lost or stolen. Most credit card companies claim that they can replace a lost or stolen credit card within 24 to 48 hours, if the customer carries the emergency replacement feature. But this replacement time period of 24 to 48 hours can be critical in many situations where the customer might need his/her card immediately, for example, while traveling out of town or being in an emergency situation. Therefore, a need exists for an improved system for replacement of lost or stolen credit cards and/or the providing of emergency funds, as necessary.

SUMMARY OF THE INVENTION

The present invention is directed towards improving the existing credit card replacement system, by providing immediate replacement of a lost or stolen card with minimization of possible fraud and with an option for providing emergency funds on a restricted basis. The problem for credit card replacement as noted above can be minimized in accordance with the principles of the present invention, by providing an additional "deactivated" credit card (spare credit card) to the customer.

The credit card company opens one account with two different card numbers, first card number for the "main credit card" and second card number for the "spare credit card". The credit card company provides the customer with two credit cards, a "Main Credit Card" and a "Spare Credit Card". The "Main Credit Card" will be the master credit card and will function identically as the existing credit cards. The "spare credit card" will also function identical to the existing credit cards, but will be "activated" for use, only when the "main credit card" is reported as lost or stolen by the customer to the credit card company. Both credit cards will never be activated at the same time. The credit card company will only "activate" the master card (main credit card) (unless otherwise indicated the term "master card" is a general term for "main card" and does not refer to and is not limited to the trademark MasterCard®) after receiving confirmation from the customer that he/she has received the two credit cards. The "spare credit card" will remain "deactivated".

When the customer reports his/her lost or stolen credit card to the company, then the credit card company blocks (Deactivates) the first credit card number (main credit card) and activates the second credit card number (spare credit card), to be used as the master credit card (main credit card). The credit card company will then replace the blocked (Deactivated) credit card number (first credit card number) with a new number and will send a new credit card (New Spare Credit Card) for the customer. The new credit card (New Spare Credit Card) will remain "deactivated".

The "deactivated" credit card (spare credit card) which will only be "activated" for use when the master credit card (main credit card) is reported as lost/stolen, should always be kept in a separate place. The two credit cards ("main credit card" and "spare credit card") should never be carried together.

Differentiation of Main and Spare Credit Cards: The two credit cards ("Main Credit Card" and "Spare Credit Card") should be distinguished from one another, in-order for the customer not to carry and use the wrong credit card (spare credit card) which is "deactivated". The distinguishable factor used for the two credit cards can be; a: sticker, b: color, c: name, other recognizable indicia or any other means. The following methods are examples of such distinguishing elements between the two cards:

a. Sticker: The credit card provider can place a sticker on the "spare credit card" in-order for the "spare credit card" to be distinguished from the "main credit card" and only when the "spare credit card" is to be used (activated), the customer will simply remove the sticker. The sticker can be in any color or form, or a special word such as, "spare" which can be written on the sticker.

b. Color: The two credit cards ("Main Credit Card" and "Spare Credit Card") can also be distinguished from one another by color. For example, the "Main Credit Card" can be in any color except Red and the "Spare Credit Card" will always come in Red.

c. Name: The two credit cards ("Main Credit Card" and "Spare Credit Card") can be distinguished from one another by name. For example the "Main Credit Card" can be named as "Credit Card" and the "Spare Credit Card" can be named as "Credit Card-T" as shown in FIG. 12.

If the customer already has a credit card, then the credit card company will add an additional new card number to the existing credit card account, to be used as the second credit card number (spare credit card). After receiving confirmation from the customer that he/she has received the "Spare Credit Card", the Credit card provider will instruct the customer to use the "Spare Credit Card" in the same manner as described above.

The "Spare Credit Card" sent to the customer will be distinguished from the "Main Credit Card", in-order for the customer not to carry and use the wrong credit card (spare credit card) which is "deactivated". As mentioned under "Differentiation of Main and Spare Credit Cards", the distinguishable factors used for the two credit cards ("Main" and "Spare") can be a sticker, color, name, general indicia or any other means.

Generally the present invention comprises a credit card use and security system method with immediate replacement capability comprising two credit cards issued to a single user by a financial institution. A first of the cards is active as a main card for transactions and a second spare card is inactive from transactions. With loss or theft of the first active main card, the first main card is deactivated by the financial institution and the second spare card is activated for immediate transaction use as a main card with an account. The financial institution issues at least one additional card according to one of the following options:

i) a new inactive spare card;

ii) a new active main card with the activated spare card being deactivated for use as a spare; and iii) a new active main card and a new deactivated spare card with the original activated spare card being destroyed.

Embodiments of the present invention include cards for one or two accounts as will be described.

The present invention further comprises systems and methods for the minimization or prevention of fraudulent use and the option of providing restricted emergency funding.

Generally the present invention comprises a method of providing emergency funds with a credit card system. The method comprises the steps of:

a) a credit card provider providing a customer with one of:
  i) two credit cards with two different card numbers, by opening one account with the two different card numbers;
  ii) opening two accounts with the two different card numbers;
  iii) opening a single account with a single credit card with a main credit line and a separate emergency credit line; and
  iv) opening, with a single credit card, a main credit line for the credit card and designating a secondary credit line as an emergency available fund, the secondary credit line comprising a predetermined percentage of the main credit line.

If two credit cards are provided, the credit card provider designates a first credit card number for a main credit card with a main credit line and designates the second card number for a spare credit card, the spare credit card having a secondary credit line as an emergency available fund, the secondary credit line comprising a predetermined percentage of the main credit line. The credit card provider sends the main credit card and the spare credit card, to the customer, with the main credit card being activated for use by the credit card provider upon confirmation of receipt by the customer, with the spare credit card remaining inactivated, If a main credit card credit limit has been fully expended and the main credit card cannot be used, upon customer's request to the credit card provider, and upon customer meeting pre-determined qualifying terms, the main credit card is deactivated and the spare credit card with the secondary credit line is activated to be used as the main credit card for a predetermined limited period of time for access to the emergency fund available in the secondary credit line, wherein usage of the emergency fund in the spare credit card is available only for a pre-determined limited time and only if the main credit line is fully expended.

If a single account is opened with a main credit line and a separate emergency credit line with a single credit card, and if a main credit card credit limit has been fully expended and the credit card cannot be used, upon customer's request to the credit card provider, and upon customer meeting pre-determined qualifying terms, the emergency credit line is activated to be used for a predetermined limited period of time for access to the emergency fund available in the emergency credit line, wherein usage of the emergency fund in the single credit card is available only for a pre-determined limited time and only if the main credit line is fully expended.

If credit card provider provides a customer with one credit card and:

i) the credit card provider designates a main credit line for the credit card and designates a secondary credit line as an emergency available fund, the secondary credit line comprises a predetermined percentage of the main credit line.

ii) the credit card provider sends the credit card to the customer, with the credit card being activated for use by the credit card provider upon confirmation of receipt by the customer, with the secondary credit line remaining inactivate, iii) if a credit card credit limit is insufficient for a transaction, upon customer's request to the credit card provider, and upon customer meeting pre-determined qualifying terms, the secondary credit line is activated to be used in conjunction with the main credit line with the following conditions:

a) access to the emergency fund available in the secondary credit line is for a predetermined limited period of time,
  b) usage of the emergency fund in the secondary credit line is available only for a pre-determined limited time and only after the main credit line is fully expended.

The above and other objects, features and advantages of the present invention will become apparent from the following description of illustrative embodiments thereof to be read in conjunction with the accompanying drawings, in which like reference numerals represent the same or similar elements.

It is to be understood, however, that the drawings are designed solely for purpose of illustration and not as a definition of the invention.

BRIEF DESCRIPTION OF THE DRAWINGS

The foregoing, and other, objects, features and advantages of the present invention will be more readily understood upon reading the following detailed description in conjunction with the drawings in which:

FIG. 3 is a front side view of the "Main Credit Card" shown as "Lost/Stolen" and a back side view of the "Spare Credit Card" showing card holder signature space and customer service contact numbers. "Spare Credit Card" is shown as "Deactivated".

FIG. 4 is a front side view of the "Main Credit Card" shown as "Lost/Stolen" and a front side view of the "Spare Credit Card" showing name (card holder), validity date and card number as shown in FIG. 1. "Spare Credit Card" is shown as "Activated".

FIG. 5 is a front side view of the two credit cards. A "New Spare Credit Card" showing new card number with the same name and validity date and the old "Spare credit card" which is now used as the "Main Credit Card". The "New Spare Credit Card" is shown as "Deactivated" and the "Main Credit Card" (Old Spare Credit Card) is shown as "Activated".

FIG. 5A is a front side view of the two credit cards. A "New Main Credit Card" showing new card number with the same name and validity date and a "Spare Credit Card" with the same credit card number, name and validity date as shown in FIG. 1. The "New Main Credit Card" is shown as "Activated" and the "Spare Credit Card" is shown as "Deactivated".

FIG. 9 is a front side view of the credit card (Main Credit Card) shown as "Lost/Stolen" and a back side view of the credit card (Spare Credit Card) showing card holder signature space and customer service contact numbers. Credit card (Spare Credit Card) is shown as "Deactivated".

FIG. 10 is a front side view of the "Main Credit Card" shown as "Lost/Stolen" and a front side view of the "Spare Credit Card" showing the same name (card holder), credit card number, but without validity date as shown in FIG. 7. The "Spare Credit Card" is called "temporary" and is shown as "Activated".

DETAILED DESCRIPTION

In this specification the term "credit card" refers to credit cards (Master Card®, Visa®, Diners Club®, etc.) as well as charge cards (e.g., American Express® some department store cards), debit cards such as usable at ATMs and many other locations or cards that are associated with a particular account, and hybrids thereof (e.g., extended payment American Express®, bank debit cards with the Visa® logo, etc.).

Figures 1, 2:
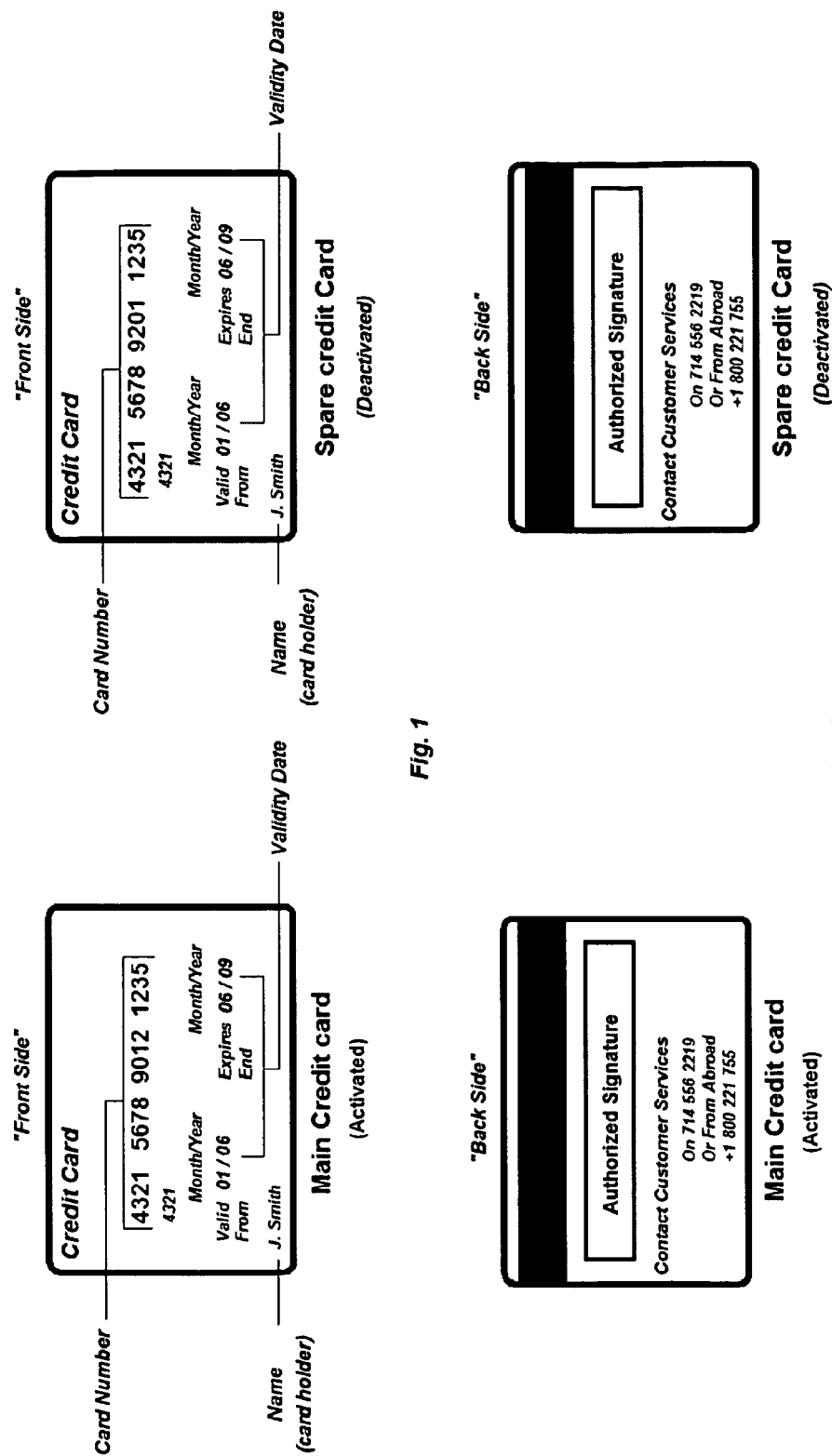
FIG. 1 is a front side view of the two credit cards, "Main Credit Card" and "Spare Credit Card" showing the same name (card holder) and validity date on both cards, with different credit card numbers. The "Main Credit Card" is shown as "Activated" and the "Spare Credit Card" is shown as "Deactivated".
FIG. 2 is a back side view of the two credit cards, "Main Credit Card" and "Spare Credit Card" showing card holder signature space and customer service contact numbers. Main Credit Card is shown as "Activated" and Spare Credit Card is shown as "Deactivated".

Referring to FIG. 1, two credit cards are shown from the front side, ("Main Credit Card" and "Spare Credit Card") with basic identification information such as, a card number, name (card holder) and validity date. Both terms "Main Credit Card" and "Spare Credit Card" refer to credit cards as generally understood, namely, that which are allocated by the credit card provider to the customer. Each credit card has a different card number, but the name of the card holder and the validity dates on both cards are the same. Because each credit card company (credit card provider) has a different card numbering system, the structure of both credit card numbers vary depending on the credit card company system.

The credit card (Main Credit Card) will be "Activated" as soon as the customer confirms the receipt of both credit cards "Main Credit Card" and "Spare Credit Card" to the Credit card provider. The credit card "Spare Credit Card" will remain "Deactivated" as shown in FIG. 1.

Referring again to FIG. 1, the credit card provider will open one account with two different card numbers, first card number for the "main credit card" and second card number for the "spare credit card". Then the Credit card provider will send a package with two credit cards to the customer, a "Main Credit Card" and a "Spare Credit Card". Upon receipt of the package, the customer will call the Credit card provider to inform them that he/she has received the two credit cards. Then the Credit card provider will "Activate" only the "Main Credit Card". The "Spare Credit Card" will remain "Deactivated".

The two credit cards ("Main Credit Card" and "Spare Credit Card") should be distinguished from one another, in-order for the customer not to carry and use the wrong credit card (spare credit card) which is "deactivated". As mentioned under "Differentiation of Main and Spare Credit Cards", the distinguishable factors used for the two credit cards ("Main" and "Spare") can be a sticker, color, name or any other means.

According to the company policy the credit card company (Credit card provider) will either provide one Personal Identification number (PIN) for both credit cards or two different Personal Identification numbers (PIN) allocated to each one of the credit cards.

After the completion of this process, the customer will be instructed to carry and use only the "Main Credit Card" which is "Activated" and keep the "Spare Credit Card" which is "Deactivated" in a separate and safe place, such as at home. In case the customer is traveling out of town, again the customer should keep the credit card (Spare Credit Card) which is "Deactivated" in a separate and safe place, such as the hotel room or any place he/she is residing at that time. The customer should never carry both credit cards together.

After the validity dates on the two credit cards ("Main Credit Card" and "Spare Credit Card") have expired, the credit card provider will issue and send two new credit cards "Main Credit Card" and "Spare Credit Card" for the customer.

If the customer already has a credit card, then the credit card company will add an additional new card number to the existing credit card account, to be used as the second credit card number (spare credit card). Upon receipt of the package, the customer will call the Credit card provider to inform them that he/she has received the "Spare Credit Card". Then the Credit card provider will instruct the customer to use the "Spare Credit Card" in the same manner as described above.

The "Spare Credit Card" sent to the customer will be distinguished from the "Main Credit Card", in-order for the customer not to carry and use the wrong credit card (spare credit card) which is "deactivated". As mentioned under "Differentiation of Main and Spare Credit Cards", the distinguishable factors used for the two credit cards ("Main" and "Spare") can be a sticker, color, name or any other means.

Referring to FIG. 2, the same two credit cards are shown from the back side, (Main Credit Card) and (Spare Credit Card) with basic information such as, card holder signature space and customer service contact numbers. The Main Credit Card will be "Activated" as soon as the customer confirms the receipt of both credit cards ("Main Credit Card" and "Spare Credit Card") to the Credit card provider as shown and described in FIG. 1. The "Spare Credit Card" will remain "Deactivated".

If the customer already has a credit card, then the credit card company will add an additional new card number to the existing credit card account, to be used as the second credit card number ("spare credit card") for the customer. The customer confirms the receipt of the "Spare Credit Card" to the credit card provider as shown and described in FIG. 1. The "Spare Credit Card" will remain "Deactivated".

The "Spare Credit Card" sent to the customer will be distinguished from the "Main Credit Card", in-order for the customer not to carry and use the wrong credit card (spare credit card) which is "deactivated". As mentioned under "Differentiation of Main and Spare Credit Cards", the distinguishable factors used for the two credit cards ("Main" and "Spare") can be a sticker, color, name or any other means.

Referring to FIG. 3, the Main Credit Card is shown as "Lost/Stolen". The "Spare Credit Card" is shown from back side as described and shown in FIG. 2. The customer service contact numbers are listed on the back side of the "Spare Credit Card" as shown and described in FIG. 2 and FIG. 3. The "Spare Credit Card" remains "Deactivated".

Referring again to FIG. 3, the customer (card holder) calls the listed customer service contact numbers on the back side of the "Spare Credit Card" to report his/her "Lost/Stolen" credit card (Main Credit Card). For security check, the credit card provider will ask the customer (card holder) to provide information such as, name, validity date, card number, PIN number, etc. Because both credit cards ("Main Credit Card" and "Spare Credit Card") are issued to one person, then the credit card provider will ask for the "Spare Credit Card" number in-order to block and "Deactivate" the Credit card (Main Credit Card). There is no need to keep a copy of the credit card (Main Credit Card) in case the credit card provider needs any information for blocking the credit card (Main Credit Card).

Referring to FIG. 4, the Main Credit Card is shown as "Lost/Stolen" and "Deactivated". The "Spare Credit Card" is also shown from the front side with basic identification information such as, a card number, name (card holder) and validity date as shown and described in FIG. 1. The "Spare Credit card" is "Activated" as shown in FIG. 4.

Referring again to FIG. 4, once the customer (card holder) reports his/her "Lost/Stolen" credit card (Main Credit Card) to the credit card provider as described and shown in FIG. 3, the credit card company blocks (Deactivates) the first credit card number (main credit card) and activates the second credit card number "spare credit card", to be used as the main credit card.

If the credit card provider has decided to place a sticker on the "spare credit card" as the distinguishing factor between the two credit cards ("Main Credit Card" and "Spare Credit Card"), then the customer will simply remove the sticker from the "spare credit card" and use the "spare credit card" as the main credit card "main credit card". As mentioned under "Differentiation of Main and Spare Credit Cards", the distinguishable factors used for the two credit cards ("Main" and "Spare") can be a sticker, color, name or any other means.

Depending on the company policy, as described and shown in FIG. 1., the Personal Identification number (PIN) used for the old "Spare Credit Card" which is now the "Main Credit Card" can be the same Personal Identification number (PIN), or a different Personal Identification number (PIN) can be allocated.

Now the customer can use the "Spare Credit Card" as the "Main Credit Card".

Referring to FIG. 5, the "New Spare Credit Card" is shown from the front side, with a new card number, but with the same validity date (depending on the credit card company policy the validity date can remain the same or can be changed). The "Spare Credit Card" which is now used as the "Main Credit Card" is also shown from the front side with the same card number and validity date as shown in FIGS. 1 and 4. The "New Spare Credit Card" is "Deactivated" and the "Main Credit Card" (Old Spare Credit Card) is "Activated".

Referring again to FIG. 5, after the customer (card holder) reports his/her "Lost/Stolen" credit card (Main Credit Card) to the credit card provider as described and shown in FIGS. 3 and 4, the credit card company will then replace the blocked (deactivated) credit card number (first credit card number) with a new number and will send a new credit card (New Spare Credit Card) to the customer. The new credit card (New Spare Credit Card) will remain "deactivated".

The credit card (New Spare Credit Card) sent to the customer will be distinguished from the "Main Credit Card" (Old Spare credit card), in-order for the customer not to carry and use the wrong credit card (New Spare credit card) which is "deactivated". As mentioned under "Differentiation of Main and Spare Credit Cards", the distinguishable factors used for the two credit cards ("Main" and "Spare") can be a sticker, color, name or any other means.

Depending on the company policy, as described and shown in FIGS. 1 and 4, the Personal Identification number (PIN) to be used for the "New Spare Credit Card" can be the same Personal Identification number (PIN), or a different Personal Identification number (PIN) can be allocated.

Upon receipt of the new credit card (New Spare Credit Card), the customer will call the credit card provider to confirm that he/she has received the new credit card (New Spare Credit Card).

Now the customer can use the "old Spare Credit Card" as the "Main Credit Card" and keep the "New Spare Credit Card" which is "Deactivated" in a separate and safe place, as shown and described in FIG. 1

After the validity dates on the two credit cards ("Main Credit Card" and "Spare Credit Card") have expired, the credit card provider will issue and send two new credit cards ("Main Credit Card" and "Spare Credit Card") to the customer.

Option 1

Summary

The credit card company opens One account with two different credit card numbers for each customer.

When the credit card is lost/stolen, the customer uses the credit card (Spare Credit Card) until a new credit card (New Main credit Card) is issued and sent to the customer.

Upon receipt of the package, the customer will call the Credit card provider to inform them that he/she has received the new credit card (New Main Credit Card). Then the Credit card provider will activate the new credit card number (New Main Credit Card) and will block (Deactivate) the second credit card number (spare credit card). The "Spare Credit Card" will be "Deactivated".

The customer can now use the new credit card (New Main Credit Card) and keep the credit card (Spare Credit Card) which is "Deactivated" in a separate and safe place. The "Spare Credit Card" does not get replaced.

In this specification the term "credit card" refers to credit cards (Master Card®, Visa®, Diners Club®, etc.) as well as charge cards (e.g., American Express®, some department store cards), debit cards such as usable at ATMs and many other locations or that are associated with a particular account, and hybrids thereof (e.g., extended payment American Express®, bank debit cards with the Visa® logo, etc.).

Referring to FIG. 1, two credit cards are shown from the front side, (Main Credit Card) and (Spare Credit Card) with basic identification information such as, a card number, name (card holder) and validity date. Both terms "Main Credit Card" and "Spare Credit Card" refer to credit cards as generally understood, namely, that which are allocated by the credit card provider to the customer. Each credit card has a different card number, but the name of the card holder and the validity dates on both cards are the same. Because each credit card company (credit card provider) has a different card numbering system, the structure of both credit card numbers vary depending on the credit card company system.

The credit card (Main Credit Card) will be "Activated" as soon as the customer confirms the receipt of both credit cards "Main Credit Card" and "Spare Credit Card" to the Credit card provider. The credit card "Spare Credit Card" will remain "Deactivated" as shown in FIG. 1.

The two credit cards ("Main Credit Card" and "Spare Credit Card") should be distinguished from one another, in order for the customer not to carry the wrong credit card (spare credit card) which is "deactivated". As mentioned under "Differentiation of Main and Spare Credit Cards", the distinguishable factors used for the two credit cards ("Main" and "Spare") can be a sticker, color, name or any other means. In option 1 the sticker on the "spare credit card" will never be removed.

Referring again to FIG. 1, The credit card provider will open one account with two different card numbers, first card number for the "main credit card" and second card number for the "spare credit card". Then the Credit card provider will send a package with two credit cards to the customer, a "Main Credit Card" and a "Spare Credit Card". Upon receipt of the package, the customer will call the Credit card provider to inform them that he/she has received the two credit cards. Then the Credit card provider will "Activate" only the "Main Credit Card". The "Spare Credit Card" will remain "Deactivated".

The credit card company (Credit card provider) will also provide one Personal Identification number (PIN) for both credit cards or, two different Personal Identification number (PIN) allocated to each one of the credit cards, according to the credit card company policy.

After the completion of this process, the customer will be instructed to carry and use only the "Main Credit Card" which is "Activated" and keep the "Spare Credit Card" which is "Deactivated" in a separate and safe place, such as at home. In case the customer is traveling out of town, again the customer should keep the credit card (Spare Credit Card) which is "Deactivated" in a separate and safe place, such as the hotel room or any place he/she is residing at that time. The customer should never carry both credit cards together.

After the validity dates on the two credit cards ("Main Credit Card" and "Spare Credit Card") have expired, the credit card provider will issue and send two new credit cards "Main Credit Card" and "Spare Credit Card" for the customer.

If the customer already has a credit card, then the credit card company will add an additional new card number to the existing credit card account, to be used as the second credit card number (spare credit card). Upon receipt of the package, the customer will call the Credit card provider to inform them that he/she has received the "Spare Credit Card". Then the Credit card provider will instruct the customer to use the "Spare Credit Card" in the same manner as described above.

The "Spare Credit Card" sent to the customer will be distinguished from the "Main Credit Card", in-order for the customer not to carry and use the wrong credit card (spare credit card) which is "deactivated". As mentioned under "Differentiation of Main and Spare Credit Cards", the distinguishable factors used for the two credit cards ("Main" and "Spare") can be a sticker, color, name or any other means. In option 1 the sticker on the "spare credit card" will never be removed.

Referring to FIG. 2, the same two credit cards are shown from the back side, (Main Credit Card) and (Spare Credit Card) with basic information such as, card holder signature space and customer service contact numbers. The credit card (Main Credit Card) will be "Activated" as soon as the customer confirms the receipt of both credit cards ("Main Credit Card" and "Spare Credit Card") to the Credit card provider as shown and described in FIG. 1. The credit card "Spare Credit Card" will remain "Deactivated".

If the customer already has a credit card, then the credit card company will add an additional new card number to the existing credit card account, to be used as the second credit card number (spare credit card). The customer confirms the receipt of the credit "Spare Credit Card" to the Credit card provider as shown and described in FIG. 1. The credit card (Spare Credit Card) will remain "Deactivated".

The "Spare Credit Card" sent to the customer will be distinguished from the "Main Credit Card", in-order for the customer not to carry and use the wrong credit card (spare credit card) which is "deactivated". As mentioned under "Differentiation of Main and Spare Credit Cards", the distinguishable factors used for the two credit cards ("Main" and "Spare") can be a sticker, color, name or any other means. In option 1 the sticker on the "spare credit card" will never be removed.

Referring to FIG. 3, the credit card (Main Credit Card) is shown as "Lost/Stolen". The "Spare Credit Card" is shown from back side as described and shown in FIG. 2. The customer service contact numbers are listed on the back side of the "Spare Credit Card" as shown and described in FIG. 2 and FIG. 3. The "Spare Credit Card" remains "Deactivated".

Referring again to FIG. 3, the customer (card holder) calls the listed customer service contact numbers on the back side of the "Spare Credit Card" to report his/her "Lost/Stolen" credit card (Main Credit Card). For security check, the credit card provider will ask the customer (card holder) to provide information such as, name, validity date, card number, PIN number, etc. Because both credit cards ("Main Credit Card" and "Spare Credit Card") are issued to one person, then the credit card provider will ask for the "Spare Credit Card" number in-order to block and "Deactivate" the Credit card (Main Credit Card). There is no need to keep a copy of the credit card (Main Credit Card) in case the credit card provider needs any information for blocking the credit card (Main Credit Card).

Referring to FIG. 4, the credit card (Main Credit Card) is shown as "Lost/Stolen" and "Deactivated". The "Spare Credit Card" is also shown from the front side with basic identification information such as, a card number, name (card holder) and validity date as shown and described in FIG. 1. The "Spare Credit card" is "Activated" as shown in FIG. 4.

Referring again to FIG. 4, once the customer (card holder) reports his/her "Lost/Stolen" credit card (Main Credit Card) to the credit card provider as described and shown in FIG.

3, the credit card company blocks (Deactivates) the first credit card number (main credit card) and activates the second credit card number (spare credit card), to be used as the spare credit card (spare credit card).

The Personal Identification number (PIN) to be used for the credit card (Spare Credit Card) can be the same Personal Identification number (PIN), or a different Personal Identification number (PIN) can be allocated, depending on the company policy, as described and shown in FIG. 1.

Now the customer can use the credit card (Spare Credit Card) until a new credit card (New Main credit Card) is issued and sent to the customer.

Referring to FIG. 5A, the new credit card (New Main Credit Card) is shown from the front side, with a new card number, but with the same validity date (the validity date can remain the same or can be changed according to the credit card company policy). The "Spare Credit Card" is also shown from the front side with the same card number and validity date as shown in FIGS. 1 and 4. The new credit card (New Main Credit Card) is "Activated" and the "Spare Credit Card" is "Deactivated".

Referring again to FIG. 5A, after the customer (card holder) reports his/her "Lost/Stolen" credit card (Main Credit Card) to the credit card provider as described and shown in FIGS. 3 and 4, the credit card company will then replace the blocked (Deactivated) credit card number (first credit card number) with a new number and will send a new credit card (New Main Credit Card) to the customer.

Upon receipt of the package, the customer will call the Credit card provider to inform them that he/she has received the new credit card (New Main Credit Card). Then the Credit card provider will activate the new credit card number (New Main Credit Card) and will block (Deactivate) the second credit card number (spare credit card). The "Spare Credit Card" will be "Deactivated".

The Personal Identification number (PIN) to be used for the new credit card (New Main Credit Card) can be the same Personal Identification number (PIN), or a different Personal Identification number (PIN) can be allocated, depending on the company policy, as described and shown in FIGS. 1 and 4.

Now the customer can use the new credit card (New Main Credit Card) and keep the credit card (Spare Credit Card) which is "Deactivated" in a separate and safe place, as shown and described in FIG. 1

After the validity dates on the two credit cards ("Main Credit Card" and "Spare Credit Card") have expired, the credit card provider will issue and send two new credit cards ("Main Credit Card" and "Spare Credit Card") for the customer.

Option 1A
Summary

The credit card company opens One account with two different credit card numbers for each customer.

When the credit card is lost/stolen, the customer uses the credit card (Spare Credit Card) until two new credit cards (New Main Credit Card and New Spare Credit Card) are issued and sent to the customer.

Upon receipt of the package, the customer will call the credit card provider to inform them that he/she has received the two new credit cards. Then the Credit card provider will activate the (New Main Credit Card) and will block (Deactivate) the (Old spare credit card). The "New Spare Credit Card" will remain "Deactivated".

The customer (card holder) will be asked to destroy the "Old Spare Credit Card" and keep the "New Spare Credit Card" which is "Deactivated", in a separate and safe place.

The Credit card provider sends two new credit cards to the customer, a "New Main Credit Card" and a "New Spare Credit Card".

Figure 6:
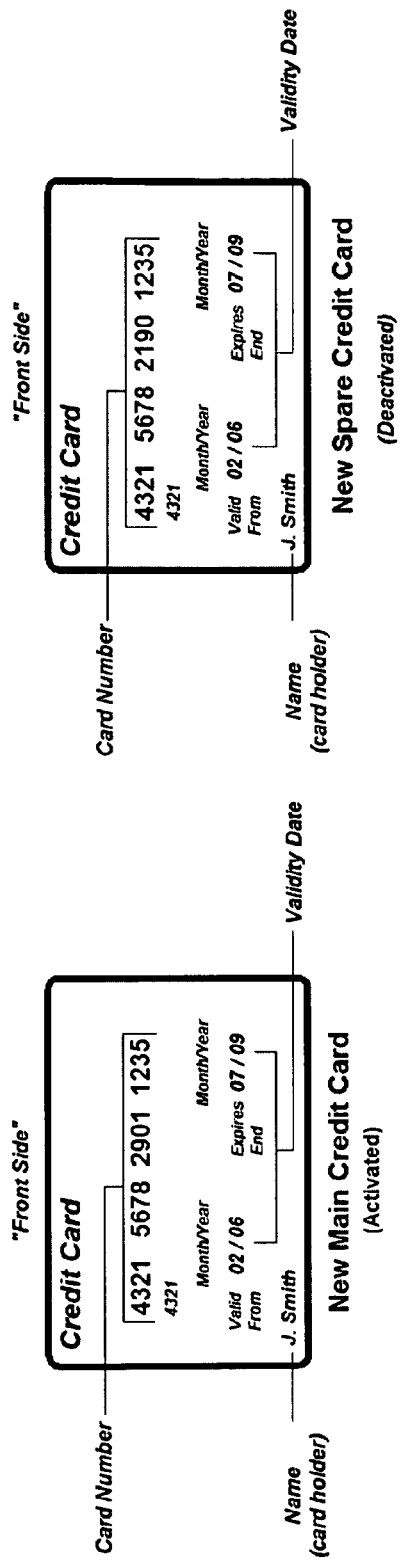
FIG. 6 is a front side view of the two credit cards. A "New Main Credit Card" showing new card number with same name and new validity date and a "New Spare Credit Card" with new credit card number, name and new validity date. The "New Main Credit Card" is shown as "Activated" and the "New Spare Credit Card" is shown as "Deactivated".

Referring to FIG. 6, the new credit card (New Main Credit Card) is shown from the front side, with a new card number and a new validity date. A new credit card (New Spare Credit Card) is also shown from the front side with a new card number and a new validity date. The new credit card (New Main Credit Card) is "Activated" and the new credit card (New Spare Credit Card) is "Deactivated".

Referring again to FIG. 6, after the customer (card holder) reports his/her "Lost/Stolen" credit card (Main Credit Card) to the credit card provider as described and shown in FIGS. 3 and 4, the Credit card provider will send a package with two new cards to the customer, a "New Main Credit Card" and a "New Spare Credit Card".

Upon receipt of the package, the customer will call the Credit card provider to inform them that he/she has received the two new credit cards. Then the Credit card provider will activate the first new credit card number (New Main Credit Card) and will block (Deactivate) the second credit card number (Old spare credit card). The "New Spare Credit Card" will be "Deactivated".

The customer (card holder) will be asked to destroy the "Old Spare Credit Card" and keep the "New Spare Credit Card" which is "Deactivated", in a separate and safe place, as shown and described in FIG. 1.

This option provides the customer with a feature in which the Credit card provider sends two new credit cards to the customer, a "New Main Credit Card" and a "New Spare Credit Card". The validity dates on both credit cards can remain the same or can be changed according to the credit card company policy.

After the validity dates on the two credit cards ("Main Credit Card" and "Spare Credit Card") have expired, the credit card provider will issue and send two new credit cards "Main Credit Card" and "Spare Credit Card" for the customer.

Option 1B
Summary

The credit card company opens one account with two different credit card numbers for each customer.

When the credit card is lost/stolen, the customer uses the credit card (Spare Credit Card) which has no validity date, until a new credit card (Main Credit Card) is issued and sent to the customer.

Upon receipt of the package, the customer will call the Credit card provider to inform them that he/she has received the new credit card (New Main Credit Card). Then the Credit card provider will activate the "New Main Credit Card" and will block (Deactivate) the "spare credit card".

The customer can now use the new credit card (New Main Credit Card) and keep the "Spare Credit Card" which is "Deactivated" in a separate and safe place.

The "Spare Credit Card" which has no validity date, allows the customer to use the "Spare Credit Card" without receiving a new "Spare Credit Card" from the credit card provider. The customer will only receive a new "Main Credit Card" when the credit card (Main Credit Card) is lost/stolen or the validity date on the credit card "Main Credit Card" has expired.

Figure 7:
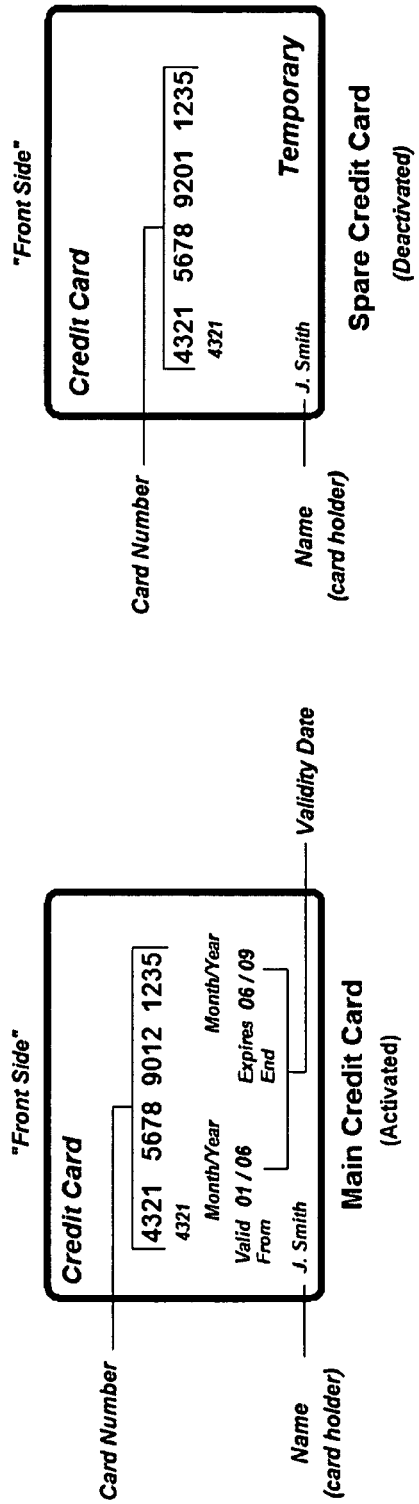
FIG. 7 is a front side view of the two credit cards. A "Main Credit Card" showing credit card number with the same name and validity date, and a "Spare Credit Card" with a different credit card number, the same name but without validity date. The "Main Credit Card" is shown as "Activated" and the "Spare Credit Card" called "Temporary" is shown as "Deactivated".

Referring to FIG. 7, the two credit cards are shown from the front side, (Main Credit Card) and (Spare Credit Card). The credit card (Main Credit Card) is issued with the basic identification information such as, a card number, name (card holder) and validity date. The "Spare Credit Card" has no validity date, but is issued with the basic identification information such as, a card number, name (card holder). Both terms "Main Credit Card" and "Spare Credit Card" refer to a credit card as generally understood, namely, that which is allocated by the credit card provider to the customer. Each credit card has a different card number, but the name of the card holder on both cards are the same. Because each credit card company (credit card provider) has a different card numbering system, the structures of both credit card numbers vary depending on the credit card company system.

The credit card (Main Credit Card) will be "Activated" as soon as the customer confirms the receipt of both credit cards ("Main Credit Card" and "Spare Credit Card") to the Credit card provider. The "Spare Credit Card" will remain "Deactivated" as shown in FIG. 7.

The two credit cards ("Main credit card" and "Spare Credit Card") will be distinguished from one another in-order for the customer not to carry and use the wrong credit card (spare credit card) which is "deactivated". As mentioned under "Differentiation of Main and Spare Credit Cards", the distinguishable factors used for the two credit cards ("Main" and "Spare") can be a sticker, color, name or any other means. In option 1B the sticker on the "spare credit card" will never be removed.

Referring again to FIG. 7, the credit card provider will open one account with two different card numbers, first card number for the "main credit card" and second card number for the "spare credit card". Then the Credit card provider will send a package with two credit cards to the customer, a "Main Credit Card" and a "Spare Credit Card". Upon receipt of the package, the customer will call the Credit card provider to inform them that he/she has received the two credit cards. Then the Credit card provider will "Activate" only the credit card "Main Credit Card". The credit card "Spare Credit Card" will remain "Deactivated".

The card company (Credit card provider) will also provide one Personal Identification number (PIN) allocated to both credit cards or two different Personal Identification numbers (PIN) allocated to each one of the credit cards, depending on the company policy.

After the completion of this process, the customer will be instructed to carry and use only the "Main Credit Card" which is "Activated" and keep the "Spare Credit Card" which is "Deactivated" in a separate place, for example, at home. In case the customer is traveling out of town, again the customer should keep the "Spare Credit Card" which is "Deactivated" in a separate place, such as the hotel room or any place he/she is residing at that time. The customer should never carry both credit cards together.

If the customer already has a credit card, then the credit card company will add an additional new card number to the existing credit card account, to be used as the second credit card number (spare credit card). Upon receipt of the package, the customer will call the Credit card provider to inform them that he/she has received the "Spare Credit Card". Then the Credit card provider will instruct the customer to use the "Spare Credit Card" in the same manner as described above.

The "Spare Credit Card" sent to the customer will be distinguished from the "Main Credit Card", in-order for the customer not to carry and use the wrong credit card (spare credit card) which is "deactivated". As mentioned under "Differentiation of Main and Spare Credit Cards", the distinguishable factors used for the two credit cards ("Main" and "Spare") can be a sticker, color, name or any other means. In option 1B the sticker on the "spare credit card" will never be removed.

Figure 8:
FIG. 8 is a back side view of the two credit cards, "Main Credit Card" and "Spare Credit Card" showing card holder signature space and customer service contact numbers. The "Main Credit Card" is shown as "Activated" and the "Spare Credit Card" is shown as "Deactivated".

Referring to FIG. 8, the same two credit cards are shown from the back side, ("Main Credit Card" and "Spare Credit Card") with basic information such as, card holder signature space and customer service contact numbers. The credit card (Main credit Card) will be "Activated" as soon as the customer confirms the receipt of both credit cards "Main Credit Card" and "Spare Credit Card" to the Credit card provider as shown and described in FIG. 7. The credit card "Spare Credit Card" will remain "Deactivated".

If the customer already has a credit card, then the credit card company will add an additional new card number to the existing credit card account, to be used as the second credit card number (spare credit card). The customer confirms the receipt of the credit card (Spare Credit Card) to the Credit card provider as shown and described in FIG. 7. The credit card "Spare Credit Card" will remain "Deactivated".

The "Spare Credit Card" sent to the customer will be distinguished from the "Main Credit Card", in-order for the customer not to carry and use the wrong credit card (spare credit card) which is "deactivated". As mentioned under "Differentiation of Main and Spare Credit Cards", the distinguishable factors used for the two credit cards ("Main" and "Spare") can be a sticker, color, name or any other means. In option 1B the sticker on the "spare credit card" will never be removed.

Referring to FIG. 9, the credit card (Main Credit Card) is shown as "Lost/Stolen". The "Spare Credit Card" is shown from back side as described and shown in FIG. 8. The customer service contact numbers are listed on the back side of the "Spare Credit Card" as shown and described in FIG. 8 and FIG. 9. The "Spare Credit Card" remains "Deactivated".

Referring again to FIG. 9, the customer (card holder) calls the listed customer service contact numbers on the back side of the "Spare credit Card" to report his/her "Lost/Stolen" credit card (Main Credit Card). For security check, the credit card provider will ask the customer (card holder) to provide information such as, name, validity date, card number, PIN number, etc. Since both credit cards ("Main credit Card" and "Spare Credit Card") are issued to one person, the credit card provider will ask for the "Spare Credit Card" number in-order to block and "Deactivate" the Credit card (Main Credit Card). There is no need to keep a copy of the credit card (Main Credit Card) in case the credit card provider needs any information for blocking the credit card (Main Credit Card).

Referring to FIG. 10, the credit card (Main Credit Card) is shown as "Lost/Stolen" and "Deactivated". The "Spare Credit Card" is also shown from the front side without a validity date, but has the basic identification information such as, a card number, name (card holder) as shown and described in FIG. 7. The "Spare Credit Card" is "Activated" as shown in FIG. 10.

Referring again to FIG. 10, once the customer (card holder) reports his/her "Lost/Stolen" credit card (Main Credit Card) to the credit card provider as described and shown in FIG. 9, the credit card company blocks (Deactivates) the first credit card number (main credit card) and activates the second credit card number "spare credit card", to be used as the spare credit card (spare credit card).

The Personal Identification number (PIN) to be used for the "Spare Credit Card" can be the same Personal Identification number (PIN), or a different Personal Identification number (PIN) can be allocated, depending on the company policy, as described and shown in FIG. 7.

Now the customer can use the "Spare Credit Card" until a new credit card (Main Credit Card) is issued and sent to the customer.

Figure 11:
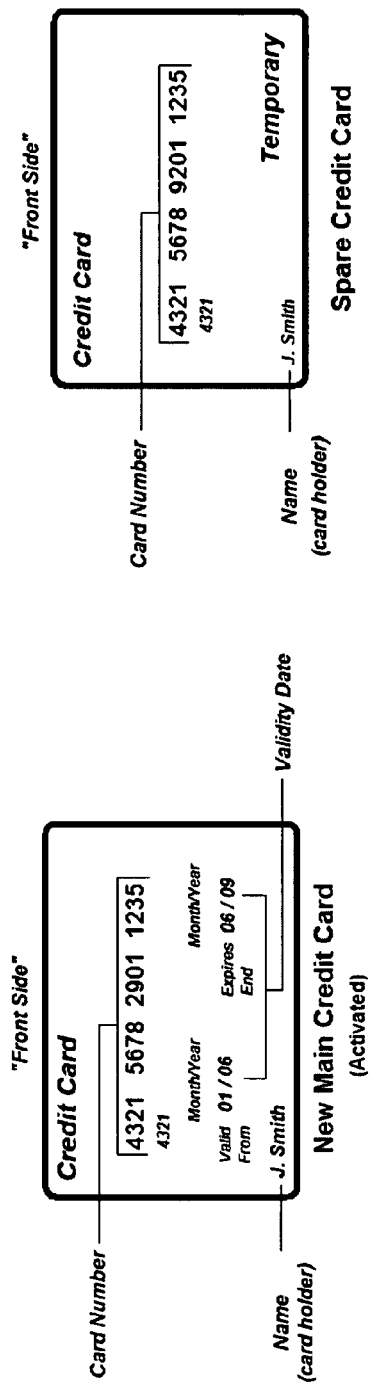
FIG. 11 is a front side view of the two credit cards. A "New Main Credit Card" showing new card number with the same name and validity date and a "Spare Credit Card" with the same credit card number, same name, but without validity date as shown in FIG. 7. The "New Main Credit Card" is shown as "Activated" and the "Spare Credit Card" is called "Temporary" and shown as "Deactivated".

Referring to FIG. 11, the new credit card (New Main Credit Card) is shown from the front side, with a new card number, but with the same validity date (the validity date can remain the same or can be changed according to the credit card company policy). The "Spare Credit Card" is also shown from the front side with the same card number but without a validity date as shown in FIGS. 7 and 10. The new credit card (New Main Credit Card) is "Activated" and the "Spare Credit Card" is "Deactivated".

Referring again to FIG. 11, after the customer (card holder) reports his/her "Lost/Stolen" credit card (Main Credit Card) to the credit card provider as described and shown in FIGS. 9 and 10, The credit card company will then replace the blocked (Deactivated) credit card number (first credit card number) with a new number and will send a new credit card (New Main Credit Card) to the customer.

Upon receipt of the package, the customer will call the Credit card provider to inform them that he/she has received the new credit card (New Main Credit Card). Then the Credit card provider will activate the first new credit card number (New Main Credit Card) and will block (Deactivate) the second credit card number (spare credit card). The "Spare Credit Card" will be "Deactivated".

The Personal Identification number (PIN) to be used for the new credit card "New main Credit Card" can be the same Personal Identification number (PIN), or a different Personal Identification number (PIN) can be allocated, depending on the company policy, as described and shown in FIGS. 7 and 10.

Now the customer can use the new credit card (New Main Credit Card) and keep the "Spare Credit Card" which is "Deactivated" in a separate and safe place, as shown and described in FIG. 7

This option provides the customer with a feature in which the "Spare Credit Card" has no validity date. This option has the advantage where the customer can always keep the "Spare Credit Card" without receiving a new "Spare Credit Card" from the credit card provider. The customer will only receive a new "Main Credit Card" when the credit card (Main Credit Card) is lost/stolen or the validity date on the credit card "Main Credit Card" has expired.

After the validity date on the credit card (Main Credit Card) has expired, the credit card provider will issue and send a new credit card (Main Credit Card) for the customer.

Figure 12:
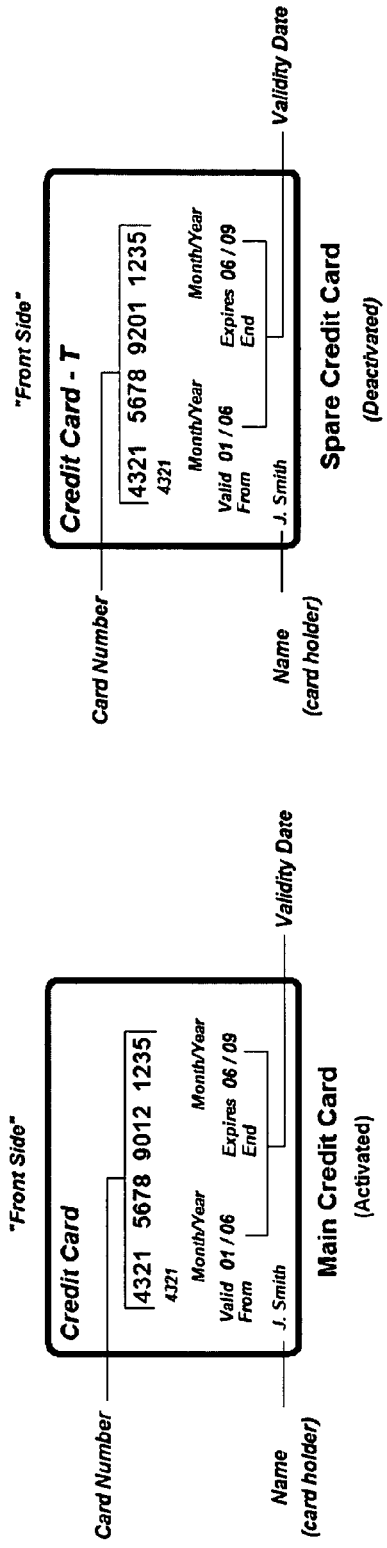
FIG. 12 is a front side view of the two credit cards, ("Main Credit Card" and "Spare Credit Card") showing the same name (card holder) and validity date but with different card numbers. The "Main Credit Card" is called the "credit card" and the "Spare Credit Card" is called the "credit card-T". The "Main Credit Card" is shown as "Activated" and the "Spare Credit Card" is shown as "Deactivated".

Referring to FIG. 12, two credit cards are shown from the front side, (Main Credit Card and Spare Credit Card) with basic identification information such as, a card number, name (card holder) and validity date. Both terms ("Main Credit Card" and "Spare Credit Card") refer to a credit card as generally understood, namely, that which is allocated by the credit card provider to the customer. Each credit card has a different card number, but the name of the card holder and the validity dates on both cards are the same. Because each credit card company (credit card provider) has a different card numbering system, the structure of both credit card numbers vary depending on the credit card company system.

In-order to distinguish the two credit cards (Main Credit Card and Spare Credit Card) from each other, the credit card "Main Credit Card" is named as "Credit Card" and the "Spare Credit Card" is named as "Credit Card-T". This feature also applies to FIGS. 1, 4, 5, 5A and 6

Option 2
Summary

The credit card company opens Two accounts with two different card numbers, first account for the "main credit card" and second account for the "spare credit card".

When the customer reports his/her lost or stolen credit card to the company, then the credit card company blocks (Deactivates) the first account (main credit card) and transfers the whole account (balance of credit) in the main credit card into the "spare credit card" and the "spare credit card" is activated to be used as the main credit card.

The credit card company will then replace the blocked (deactivated) first account with a new account and will send a new credit card (New Spare Credit Card) for the customer. The new credit card (New Spare Credit Card) will remain "deactivated".

The credit card company opens two accounts with two different card numbers, first account for the "main credit card" and second account for the "spare credit card". Then the credit card company provides the customer with two credit cards, a "main credit card" and a "spare credit card". The "main credit card" will be the master credit card and will function identically as the existing credit cards. The "spare credit card" will also function identical to the existing credit cards, but will be "activated" for use, only when the "main credit card" is reported as lost or stolen by the customer to the credit card company. Both credit cards will never be activated at the same time. The credit card company will only "activate" the master card "main credit card" after receiving confirmation from the customer that he/she has received the two credit cards. The "spare credit card" will remain "deactivated".

When the customer reports his/her lost or stolen credit card to the company, then the credit card company blocks (Deactivates) the first account (main credit card) and transfers the whole account (balance of credit) in the master card (main credit card) into the "spare credit card" and the "spare credit card" is activated to be used as the master credit card (main credit card). The credit card company will then replace the blocked (deactivated) first account with a new account (or reactivate the first account) and will send a new credit card (New Spare Credit Card) for the customer. The new credit card (New Spare Credit Card) will remain "deactivated".

The "deactivated" credit card (spare credit card) which will only be "activated" for use when the master credit card (main credit card) is reported as lost/stolen, should always be kept in a separate place. The two credit cards ("main credit card" and "spare credit card") should never be carried together.

The two credit cards ("Main Credit Card" and "Spare Credit Card") should be distinguished from one another, in-order for the customer not to carry and use the wrong credit card (spare credit card) which is "deactivated". As mentioned under "Differentiation of Main and Spare Credit Cards", the distinguishable factors used for the two credit cards ("Main" and "Spare") can be a sticker, color, name or any other means.

If the customer already has a credit card, then the credit card company will open an additional new card account with a new card number, to be used as the second account (spare credit card). After receiving confirmation from the customer that he/she has received the "Spare Credit Card", the Credit card provider will instruct the customer to use the "Spare Credit Card" in the same manner as described above.

The "Spare Credit Card" sent to the customer will be distinguished from the "Main Credit Card", in-order for the customer not to carry and use the wrong credit card (spare credit card) which is "deactivated". As mentioned under "Differentiation of Main and Spare Credit Cards", the distinguishable factors used for the two credit cards ("Main" and "Spare") can be a sticker, color, name or any other means.

Referring to FIG. 1, two credit cards are shown from the front side, ("Main Credit Card" and "Spare Credit Card") with basic identification information such as, a card number, name (card holder) and validity date. Both terms "Main Credit Card" and "Spare Credit Card" refer to credit cards as generally understood, namely, that which are allocated by the credit card provider to the customer. Each credit card has a different card number, but the name of the card holder and the validity dates on both cards are the same. Because each credit card company (credit card provider) has a different card numbering system, the structure of both credit card numbers vary depending on the credit card company system.

The credit card (Main Credit Card) will be "Activated" as soon as the customer confirms the receipt of both credit cards "Main Credit Card" and "Spare Credit Card" to the Credit card provider. The credit card "Spare Credit Card" will remain "Deactivated" as shown in FIG. 1.

Referring again to FIG. 1, the credit card provider will open two accounts with two different card numbers, first account for the "main credit card" and second account for the "spare credit card". Then the Credit card provider will send a package with two credit cards to the customer, a "Main Credit Card" and a "Spare Credit Card". Upon receipt of the package, the customer will call the Credit card provider to inform them that he/she has received the two credit cards. Then the Credit card provider will "Activate" only the "Main Credit Card". The "Spare Credit Card" will remain "Deactivated".

The two credit cards ("Main Credit Card" and "Spare Credit Card") should be distinguished from one another, in-order for the customer not to carry and use the wrong credit card (spare credit card) which is "deactivated". As mentioned under "Differentiation of Main and Spare Credit Cards", the distinguishable factors used for the two credit cards ("Main" and "Spare") can be a sticker, color, name or any other means.

According to the company policy the credit card company (Credit card provider) will either provide one Personal Identification number (PIN) for both credit cards or two different Personal Identification numbers (PIN) allocated to each one of the credit cards.

After the completion of this process, the customer will be instructed to carry and use only the "Main Credit Card" which is "Activated" and keep the "Spare Credit Card" which is "Deactivated" in a separate and safe place, such as at home. In case the customer is traveling out of town, again the customer should keep the credit card (Spare Credit Card) which is "Deactivated" in a separate and safe place, such as the hotel room or any place he/she is residing at that time. The customer should never carry both credit cards together.

After the validity dates on the two credit cards ("Main Credit Card" and "Spare Credit Card") have expired, the credit card provider will issue and send two new credit cards "Main Credit Card" and "Spare Credit Card" for the customer.

If the customer already has a credit card, then the credit card company will open an additional new card account with a new card number, to be used as the second account (spare credit card). Upon receipt of the package, the customer will call the Credit card provider to inform them that he/she has received the "Spare Credit Card". Then the Credit card provider will instruct the customer to use the "Spare Credit Card" in the same manner as described above.

The "Spare Credit Card" sent to the customer will be distinguished from the "Main Credit Card", in-order for the customer not to carry and use the wrong credit card (spare credit card) which is "deactivated". As mentioned under "Differentiation of Main and Spare Credit Cards", the distinguishable factors used for the two credit cards ("Main" and "Spare") can be a sticker, color, name or any other means.

Referring to FIG. 2, the same two credit cards are shown from the back side, ("Main Credit Card" and "Spare Credit Card") with basic information such as, card holder signature space and customer service contact numbers. The Main Credit Card will be "Activated" as soon as the customer confirms the receipt of both credit cards ("Main Credit Card" and "Spare Credit Card") to the Credit card provider as shown and described in FIG. 1. The "Spare Credit Card" will remain "Deactivated".

If the customer already has a credit card, then the credit card company will open an additional new card account with a new card number, to be used as the second account (spare credit card). The customer confirms the receipt of the "Spare Credit Card" to the credit card provider as shown and described in FIG. 1. The "Spare Credit Card" will remain "Deactivated".

The "Spare Credit Card" sent to the customer will be distinguished from the "Main Credit Card", in-order for the customer not to carry and use the wrong credit card (spare credit card) which is "deactivated". As mentioned under "Differentiation of Main and Spare Credit Cards", the distinguishable factors used for the two credit cards ("Main" and "Spare") can be a sticker, color, name or any other means.

Referring to FIG. 3, the Main Credit Card is shown as "Lost/Stolen". The "Spare Credit Card" is shown from back side as described and shown in FIG. 2. The customer service contact numbers are listed on the back side of the "Spare Credit Card" as shown and described in FIG. 2 and FIG. 3. The "Spare Credit Card" remains "Deactivated".

Referring again to FIG. 3, the customer (card holder) calls the listed customer service contact numbers on the back side of the "Spare Credit Card" to report his/her "Lost/Stolen" credit card (Main Credit Card). For security check, the credit card provider will ask the customer (card holder) to provide information such as, name, validity date, card number, PIN number, etc. Because both credit cards ("Main Credit Card" and "Spare Credit Card") are issued to one person, the first account number for the "main credit card" will display the second account number for the "spare credit card" and the second account number for the "spare credit card" will display the first account number for the "main credit card". Then the credit card provider will ask for the "Spare Credit Card" number in-order to block and "Deactivate" the Credit card (Main Credit Card). There is no need to keep a copy of the credit card (Main Credit Card) in case the credit card provider needs any information for blocking the credit card (Main Credit Card).

Referring to FIG. 4, the Main Credit Card is shown as "Lost/Stolen" and "Deactivated". The "Spare Credit Card" is also shown from the front side with basic identification information such as, a card number, name (card holder) and validity date as shown and described in FIG. 1. The "Spare Credit card" is "Activated" as shown in FIG. 4.

Referring again to FIG. 4, once the customer (card holder) reports his/her "Lost/Stolen" credit card (Main Credit Card) to the credit card provider as described and shown in FIG.

3, the credit card company blocks (Deactivates) the first account (main credit card) and transfers the whole account (balance of credit) in the master card (main credit card) into the "spare credit card" and the "spare credit card" is activated to be used as the master credit card (main credit card).

If the credit card provider has decided to place a sticker on the "spare credit card" as the distinguishing factor between the two credit cards ("Main Credit Card" and "Spare Credit Card"), then the customer will simply remove the sticker from the "spare credit card" and use the "spare credit card" as the master credit card (main credit card). As mentioned under "Differentiation of Main and Spare Credit Cards", the distinguishable factors used for the two credit cards ("Main" and "Spare") can be a sticker, color, name or any other means.

Depending on the company policy, as described and shown in FIG. 1., the Personal Identification number (PIN) used for the old "Spare Credit Card" which is now the "Main Credit Card" can be the same Personal Identification number (PIN), or a different Personal Identification number (PIN) can be allocated.

Now the customer can use the "Spare Credit Card" as the "Main Credit Card".

Referring to FIG. 5, the "New Spare Credit Card" is shown from the front side, with a new card number, but with the same validity date (depending on the credit card company policy the validity date can remain the same or can be changed). The "Spare Credit Card" which is now used as the "Main Credit Card" is also shown from the front side with the same card number and validity date as shown in FIGS. 1 and 4. The "New Spare Credit Card" is "Deactivated" and the "Main Credit Card" (Old Spare Credit Card) is "Activated".

Referring again to FIG. 5, after the customer (card holder) reports his/her "Lost/Stolen" credit card (Main Credit Card) to the credit card provider as described and shown in FIGS. 3 and 4, the credit card company will then replace the blocked (Deactivated) first account with a new account (or reactivate the first account) and will send a new credit card (New Spare Credit Card) for the customer. The new credit card (New Spare Credit Card) will remain "deactivated".

The credit card "New Spare Credit Card" sent to the customer will be distinguished from the "Main Credit Card" (Old Spare Credit Card) in-order for the customer not to carry and use the wrong credit card (new spare credit card) which is "deactivated". As mentioned under "Differentiation of Main and Spare Credit Cards", the distinguishable factors used for the two credit cards ("Main" and "Spare") can be a sticker, color, name or any other means.

Depending on the company policy, as described and shown in FIGS. 1 and 4, the Personal Identification number (PIN) to be used for the "New Spare Credit Card" can be the same Personal Identification number (PIN), or a different Personal Identification number (PIN) can be allocated.

Upon receipt of the new credit card (New Spare Credit Card), the customer will call the credit card provider to confirm that he/she has received the new credit card (New Spare Credit Card).

Now the customer can use the old "Spare Credit Card" as the "Main Credit Card" and keep the "New Spare Credit Card" which is "Deactivated" in a separate and safe place, as shown and described in FIG. 1

After the validity dates on the two credit cards ("Main Credit Card" and "Spare Credit Card") have expired, the credit card provider will issue and send two new credit cards ("Main Credit Card" and "Spare Credit Card") for the customer.

Option 2A

Summary

The credit card company opens Two accounts with two different card numbers, first account for the "main credit card" and second account for the "spare credit card".

When the credit card is lost/stolen, the customer uses the credit card (Spare Credit Card) until a new credit card (New Main credit Card) is issued and sent to the customer.

Upon receipt of the package, the customer will call the Credit card provider to inform them that he/she has received the new credit card (New Main Credit Card). Then the Credit card provider will "Activate" the new credit card (New Main Credit Card) and will transfer the whole account (balance of credit) from the "Spare Credit Card" into the new credit card (New Main Credit Card). The "Spare Credit Card" will be "Deactivated".

The customer can now use the new credit card (New Main Credit Card) and keep the credit card (Spare Credit Card) which is "Deactivated" in a separate and safe place.

In this specification the term "credit card" refers to credit cards (Master Card®, Visa®, Diners Club®, etc.) as well as charge cards (e.g., American Express®, some department store cards), debit cards such as usable at ATMs and many other locations or that are associated with a particular account, and hybrids thereof (e.g., extended payment American Express®, bank debit cards with the Visa® logo, etc.).

Referring to FIG. 1, two credit cards are shown from the front side, (Main Credit Card) and (Spare Credit Card) with basic identification information such as, a card number, name (card holder) and validity date. Both terms "Main Credit Card" and "Spare Credit Card" refer to credit cards as generally understood, namely, that which are allocated by the credit card provider to the customer. Each credit card has a different card number, but the name of the card holder and the validity dates on both cards are the same. Because each credit card company (credit card provider) has a different card numbering system, the structure of both credit card numbers vary depending on the credit card company system.

The credit card (Main Credit Card) will be "Activated" as soon as the customer confirms the receipt of both credit cards "Main Credit Card" and "Spare Credit Card" to the Credit card provider. The credit card "Spare Credit Card" will remain "Deactivated" as shown in FIG. 1.

The two credit cards ("Main Credit Card" and "Spare Credit Card") should be distinguished from one another, in order for the customer not to carry the wrong credit card (spare credit card) which is "deactivated". As mentioned under "Differentiation of Main and Spare Credit Cards", the distinguishable factors used for the two credit cards ("Main" and "Spare") can be a sticker, color, name or any other means. In option 2A the sticker on the "spare credit card" will never be removed.

Referring again to FIG. 1, the Credit card provider will send a package with two credit cards to the customer, a "Main Credit Card" and a "Spare Credit Card". Upon receipt of the package, the customer will call the Credit card provider to inform them that he/she has received the two credit cards. Then the Credit card provider will "Activate" only the "Main Credit Card". The "Spare Credit Card" will remain "Deactivated".

The credit card company (Credit card provider) will also provide one Personal Identification number (PIN) for both credit cards or, two different Personal Identification number (PIN) allocated to each one of the credit cards, according to the credit card company policy.

After the completion of this process, the customer will be instructed to carry and use only the "Main Credit Card" which is "Activated" and keep the "Spare Credit Card" which is "Deactivated" in a separate and safe place, such as at home. In case the customer is traveling out of town, again the customer should keep the credit card (Spare Credit Card) which is "Deactivated" in a separate and safe place, such as the hotel room or any place he/she is residing at that time. The customer should never carry both credit cards together.

After the validity dates on the two credit cards ("Main Credit Card" and "Spare Credit Card") have expired, the credit card provider will issue and send two new credit cards "Main Credit Card" and "Spare Credit Card" for the customer.

If the customer already has a credit card, then the credit card company will open a new account with a new card number, to be used as the second account (spare credit card). Upon receipt of the package, the customer will call the Credit card provider to inform them that he/she has received the "Spare Credit Card". Then the Credit card provider will instruct the customer to use the "Spare Credit Card" in the same manner as described above.

The "Spare Credit Card" sent to the customer will be distinguished from the "Main Credit Card", in-order for the customer not to carry and use the wrong credit card (spare credit card) which is "deactivated". As mentioned under "Differentiation of Main and Spare Credit Cards", the distinguishable factors used for the two credit cards ("Main" and "Spare") can be a sticker, color, name or any other means. In option 2A the sticker on the "spare credit card" will never be removed.

Referring to FIG. 2, the same two credit cards are shown from the back side, ("Main Credit Card" and "Spare Credit Card") with basic information such as, card holder signature space and customer service contact numbers. The credit card (Main Credit Card) will be "Activated" as soon as the customer confirms the receipt of both credit cards ("Main Credit Card" and "Spare Credit Card") to the Credit card provider as shown and described in FIG. 1. The credit card "Spare Credit Card" will remain "Deactivated".

If the customer already has a credit card, then the credit card company will open a new card account with a new card number, to be used as the second account (spare credit card). The customer confirms the receipt of the credit "Spare Credit Card" to the Credit card provider as shown and described in FIG. 1. The credit card "Spare Credit Card" will remain "Deactivated".

The "Spare Credit Card" sent to the customer will be distinguished from the "Main Credit Card", in-order for the customer not to carry and use the wrong credit card (spare credit card) which is "deactivated". As mentioned under "Differentiation of Main and Spare Credit Cards", the distinguishable factors used for the two credit cards ("Main" and "Spare") can be a sticker, color, name or any other means. In option 2A the sticker on the "spare credit card" will never be removed.

Referring to FIG. 3, the credit card (Main Credit Card) is shown as "Lost/Stolen". The "Spare Credit Card" is shown from back side as described and shown in FIG. 2. The customer service contact numbers are listed on the back side of the "Spare Credit Card" as shown and described in FIG. 2 and FIG. 3. The "Spare Credit Card" remains "Deactivated".

Referring again to FIG. 3, the customer (card holder) calls the listed customer service contact numbers on the back side of the "Spare Credit Card" to report his/her "Lost/Stolen" credit card (Main Credit Card). For security check, the credit card provider will ask the customer (card holder) to provide information such as, name, validity date, card number, PIN number, etc. Because both credit cards ("Main Credit Card" and "Spare Credit Card") are issued to one person, the first account for the "main credit card" will display the second account for the "spare credit card" and the second account for the "spare credit card" will display the first account for the "main credit card". Then the credit card provider will ask for the "Spare Credit Card" number in-order to block and "Deactivate" the Credit card (Main Credit Card). There is no need to keep a copy of the credit card (Main Credit Card) in case the credit card provider needs any information for blocking the credit card (Main Credit Card).

Referring to FIG. 4, the credit card (Main Credit Card) is shown as "Lost/Stolen" and "Deactivated". The "Spare Credit Card" is also shown from the front side with basic identification information such as, a card number, name (card holder) and validity date as shown and described in FIG. 1. The "Spare Credit card" is "Activated" as shown in FIG. 4.

Referring again to FIG. 4, once the customer (card holder) reports his/her "Lost/Stolen" credit card (Main Credit Card) to the credit card provider as described and shown in FIG. 3, the credit card company blocks (Deactivates) the first account (main credit card) and transfers the whole account (balance of credit) in the master card (main credit card) into the "spare credit card" account and the "Spare Credit Card" is "Activated".

The Personal Identification number (PIN) to be used for the credit card (Spare Credit Card) can be the same Personal Identification number (PIN), or a different Personal Identification number (PIN) can be allocated, depending on the company policy, as described and shown in FIG. 1.

Now the customer can use the credit card (Spare Credit Card) until a new credit card (New Main credit Card) is issued and sent to the customer.

Referring to FIG. 5A, the new credit card (New Main Credit Card) is shown from the front side, with a new card number, but with the same validity date (the validity date can remain the same or can be changed according to the credit card company policy). The "Spare Credit Card" is also shown from the front side with the same card number and validity date as shown in FIGS. 1 and 4. The new credit card (New Main Credit Card) is "Activated" and the "Spare Credit Card" is "Deactivated".

Referring again to FIG. 5A, after the customer (card holder) reports his/her "Lost/Stolen" credit card (Main Credit Card) to the credit card provider as described and shown in FIGS. 3 and 4, the credit card company will then replace the blocked (Deactivated) first account with a new account (or reactivated first account) and will send a new credit card (New Main Credit Card) to the customer.

Upon receipt of the package, the customer will call the Credit card provider to inform them that he/she has received the new credit card (New Main Credit Card). Then the Credit card provider will "Activate" the new credit card (New Main Credit Card) and will transfer the whole account (balance of credit) from the "Spare Credit Card" into the new credit card (New Main Credit Card). The "Spare Credit Card" will be "Deactivated".

The Personal Identification number (PIN) to be used for the new credit card (New main Credit Card) can be the same Personal Identification number (PIN), or a different Personal Identification number (PIN) can be allocated, depending on the company policy, as described and shown in FIGS. 1 and 4.

Now the customer can use the new credit card (New Main Credit Card) and keep the credit card (Spare Credit Card) which is "Deactivated" in a separate and safe place, as shown and described in FIG. 1

After the validity dates on the two credit cards ("Main Credit Card" and "Spare Credit Card") have expired, the credit card provider will issue and send two new credit cards ("Main Credit Card" and "Spare Credit Card") for the customer.

Option 2B

Summary

The credit card company opens Two accounts with two different card numbers, first account for the "main credit card" and second account for the "spare credit card".

When the credit card is lost/stolen, the customer uses the credit card (Spare Credit Card) until two new credit cards ("New Main Credit Card" and "New Spare Credit Card") are issued and sent to the customer.

Upon receipt of the package, the customer will call the Credit card provider to inform them that he/she has received the two new credit cards. Then the credit card provider will "Activate" the new credit card (New Main Credit Card) and will transfer the whole account (balance of credit) from the old credit card (Old Spare credit Card) into the new credit card (New Main Credit Card). The "New Spare Credit Card" will remain "Deactivated".

The customer (card holder) will be asked to destroy the "Old Spare Credit Card" and keep the "New Spare Credit Card" which is "Deactivated", in a separate and safe place.

The Credit card provider sends two new credit cards to the customer, a "New Main Credit Card" and a "New Spare Credit Card".

Referring to FIG. 6, the new credit card (New Main Credit Card) is shown from the front side, with a new card number and a new validity date. A new credit card (New Spare Credit Card) is also shown from the front side with a new card number and a new validity date. The new credit card (New Main Credit Card) is "Activated" and the new credit card (New Spare Credit Card) is "Deactivated".

Referring again to FIG. 6, after the customer (card holder) reports his/her "Lost/Stolen" credit card (Main Credit Card) to the credit card provider as described and shown in FIGS. 3 and 4, the Credit card provider will send a package with two new cards to the customer, a "New Main Credit Card" and a "New Spare Credit Card".

Upon receipt of the package, the customer will call the Credit card provider to inform them that he/she has received the two new credit cards. Then the credit card provider will "Activate" the new credit card (New Main Credit Card) and will transfer the whole account (balance of credit) from the old credit card (Old Spare credit Card) into the new credit card (New Main Credit Card). The "New Spare Credit Card" will be "Deactivated".

The customer (card holder) will be asked to destroy the "Old Spare Credit Card" and keep the "New Spare Credit Card" which is "Deactivated", in a separate and safe place, as shown and described in FIG. 1.

This option provides the customer with a feature in which the Credit card provider sends two new credit cards to the customer, a "New Main Credit Card" and a "New Spare Credit Card". The validity dates on both credit cards can remain the same or can be changed according to the credit card company policy.

After the validity dates on the two credit cards ("Main Credit Card" and "Spare Credit Card") have expired, the credit card provider will issue and send two new credit cards "Main Credit Card" and "Spare Credit Card" for the customer.

Option 2C

Summary

The credit card company opens Two accounts with two different card numbers, first account for the "main credit card" and second account for the "spare credit card".

When the credit card is lost/stolen, the customer uses the credit card (Spare Credit Card) which has no validity date, until a new credit card (Main Credit Card) is issued and sent to the customer.

Upon receipt of the package, the customer will call the Credit card provider to inform them that he/she has received the new credit card (New Main Credit Card). Then the Credit card provider will "Activate" the new credit card (New Main Credit Card) and will transfer the whole account (balance of credit) from the "Spare Credit Card" into the new credit card (New Main Credit Card). The "Spare Credit Card" will be "Deactivated".

The customer can use the new credit card (New Main Credit Card) and keep the "Spare Credit Card" which is "Deactivated" in a separate and safe place.

The "Spare Credit Card" has no validity date, allows the customer to use the "Spare Credit Card" without receiving a new "Spare Credit Card" from the credit card provider. The customer will only receive a new "Main Credit Card" when the credit card (Main Credit Card) is lost/stolen or the validity date on the credit card "Main Credit Card" has expired.

Referring to FIG. 7, the two credit cards are shown from the front side, (Main Credit Card) and (Spare Credit Card). The credit card "Main Credit Card" is issued with the basic identification information such as, a card number, name (card holder) and validity date. The credit card (Spare Credit Card) has no validity date, but is issued with the basic identification information such as, a card number, name (card holder). Both terms "Main Credit Card" and "Spare Credit Card" refer to a credit card as generally understood, namely, that which is allocated by the credit card provider to the customer. Each credit card has a different card number, but the name of the card holder on both cards are the same. Because each credit card company (credit card provider) has a different card numbering system, the structures of both credit card numbers vary depending on the credit card company system.

The credit card (Main Credit Card) will be "Activated" as soon as the customer confirms the receipt of both credit cards ("Main Credit Card" and "Spare Credit Card") to the Credit card provider. The "Spare Credit Card" will remain "Deactivated" as shown in FIG. 7.

The two credit cards ("Main Credit Card" and "Spare Credit Card") will be distinguished from one another, in-order for the customer not to carry and use the wrong credit card (spare credit card) which is "deactivated". As mentioned under "Differentiation of Main and Spare Credit Cards", the distinguishable factors used for the two credit cards ("Main" and "Spare") can be a sticker, color, name or any other means. In option 2C the sticker on the "spare credit card" will never be removed.

Referring again to FIG. 7, the Credit card provider will send a package with two credit cards to the customer, a "Main Credit Card" and a "Spare Credit Card". Upon receipt of the package, the customer will call the Credit card provider to inform them that he/she has received the two credit cards. Then the Credit card provider will "Activate"

only the credit card "Main Credit Card". The credit card "Spare Credit Card" will remain "Deactivated".

The card company (Credit card provider) will also provide one Personal Identification number (PIN) allocated to both credit cards or two different Personal Identification numbers (PIN) allocated to each one of the credit cards, depending on the company policy.

After the completion of this process, the customer will be instructed to carry and use only the "Main Credit Card" which is "Activated" and keep the "Spare Credit Card" which is "Deactivated" in a separate place, for example, at home. In case the customer is traveling out of town, again the customer should keep the "Spare Credit Card" which is "Deactivated" in a separate place, such as the hotel room or any place he/she is residing at that time. The customer should never carry both credit cards together.

If the customer already has a credit card, then the credit card company will open a new account with a new card number, to be used as the second account (spare credit card). Upon receipt of the package, the customer will call the Credit card provider to inform them that he/she has received the "Spare Credit Card". Then the Credit card provider will instruct the customer to use the "Spare Credit Card" in the same manner as described above.

The "Spare Credit Card" sent to the customer will be distinguished from the "Main Credit Card", in-order for the customer not to carry and use the wrong credit card (spare credit card) which is "deactivated" As mentioned under "Differentiation of Main and Spare Credit Cards", the distinguishable factors used for the two credit cards ("Main" and "Spare") can be a sticker, color, name or any other means. In option 2C the sticker on the "spare credit card" will never be removed.

Referring to FIG. 8, the same two credit cards are shown from the back side, ("Main Credit Card" and "Spare Credit Card") with basic information such as, card holder signature space and customer service contact numbers. The credit card (Main credit Card) will be "Activated" as soon as the customer confirms the receipt of both credit cards "Main Credit Card" and "Spare Credit Card" to the Credit card provider as shown and described in FIG. 7. The credit card "Spare Credit Card" will remain "Deactivated".

If the customer already has a credit card, then the credit card company will open a new card account with a new card number, to be used as the second account (spare credit card). The customer confirms the receipt of the credit card (Spare Credit Card) to the Credit card provider as shown and described in FIG. 7. The credit card "Spare Credit Card" will remain "Deactivated".

The "Spare Credit Card" sent to the customer will be distinguished from the "Main Credit Card", in-order for the customer not to carry and use the wrong credit card ("pare credit card) which is "deactivated". As mentioned under "Differentiation of Main and Spare Credit Cards", the distinguishable factors used for the two credit cards ("Main" and "Spare") can be a sticker, color, name or any other means. In option 2C the sticker on the "spare credit card" will never be removed.

Referring to FIG. 9, the credit card (Main Credit Card) is shown as "Lost/Stolen". The "Spare Credit Card" is shown from back side as described and shown in FIG. 8. The customer service contact numbers are listed on the back side of the "Spare Credit Card" as shown and described in FIG. 8 and FIG. 9. The "Spare Credit Card" remains "Deactivated".

Referring again to FIG. 9, the customer (card holder) calls the listed customer service contact numbers on the back side of the "Spare credit Card" to report his/her "Lost/Stolen" credit card (Main Credit Card). For security check, the credit card provider will ask the customer (card holder) to provide information such as, name, validity date, card number, PIN number, etc. Since both credit cards ("Main credit Card" and "Spare Credit Card") are issued to one person, the first account for the "main credit card" will display the second account for the "spare credit card" and the second account for the "spare credit card" will display the first account for the "main credit card". Then the credit card provider will ask for the "Spare Credit Card" number in-order to block and "Deactivate" the Credit card (Main Credit Card). There is no need to keep a copy of the credit card (Main Credit Card) in case the credit card provider needs any information for blocking the credit card (Main Credit Card).

Referring to FIG. 10, the credit card (Main Credit Card) is shown as "Lost/Stolen" and "Deactivated". The "Spare Credit Card" is also shown from the front side without a validity date, but has the basic identification information such as, a card number, name (card holder) as shown and described in FIG. 7. The "Spare Credit Card" is "Activated" as shown in FIG. 10.

Referring again to FIG. 10, once the customer (card holder) reports his/her "Lost/Stolen" credit card (Main Credit Card) to the credit card provider as described and shown in FIG. 9, the credit card company blocks (Deactivates) the first account (main credit card) and transfers the whole account (balance of credit) in the master card (main credit card) into the "spare credit card" and the "Spare Credit Card" is "Activated".

The Personal Identification number (PIN) to be used for the "Spare Credit Card" can be the same Personal Identification number (PIN), or a different Personal Identification number (PIN) can be allocated, depending on the company policy, as described and shown in FIG. 7.

Now the customer can use the "Spare Credit Card" until a new credit card (Main Credit Card) is issued and sent to the customer.

Referring to FIG. 11, the new credit card (New Main Credit Card) is shown from the front side, with a new card number, but with the same validity date (the validity date can remain the same or can be changed according to the credit card company policy). The "Spare Credit Card" is also shown from the front side with the same card number but without a validity date as shown in FIGS. 7 and 10. The new credit card (New Main Credit Card) is "Activated" and the "Spare Credit Card" is "Deactivated".

Referring again to FIG. 11, after the customer (card holder) reports his/her "Lost/Stolen" credit card (Main Credit Card) to the credit card provider as described and shown in FIGS. 9 and 10, the credit card company will then replace the blocked (Deactivated) first account with a new account (or reactivate the first account) and will send a new credit card (New Main Credit Card) to the customer.

Upon receipt of the package, the customer will call the Credit card provider to inform them that he/she has received the new credit card (New Main Credit Card). Then the Credit card provider will "Activate" the new credit card (New Main Credit Card) and will transfer the whole account (balance of credit) from the "Spare Credit Card" into the new credit card (New Main Credit Card). The "Spare Credit Card" will be "Deactivated".

The Personal Identification number (PIN) to be used for the new credit card "New main Credit Card" can be the same Personal Identification number (PIN), or a different Personal Identification number (PIN) can be allocated, depending on the company policy, as described and shown in FIGS. 7 and 10.

Now the customer can use the new credit card (New Main Credit Card) and keep the "Spare Credit Card" which is "Deactivated" in a separate and safe place, as shown and described in FIG. 7

This option provides the customer with a feature in which the "Spare Credit Card" has no validity date. This option has the advantage where the customer can always keep the "Spare Credit Card" without receiving a new "Spare Credit Card" from the credit card provider. The customer will only receive a new "Main Credit Card" when the credit card (Main Credit Card) is lost/stolen or the validity date on the credit card "Main Credit Card" has expired.

After the validity date on the credit card (Main Credit Card) has expired, the credit card provider will issue and send a new credit card (Main Credit Card) for the customer.

Referring to FIG. 12, two credit cards are shown from the front side, (Main Credit Card and Spare Credit Card) with basic identification information such as, a card number, name (card holder) and validity date. Both terms ("Main Credit Card" and "Spare Credit Card") refer to a credit card as generally understood, namely, that which is allocated by the credit card provider to the customer. Each credit card has a different card number, but the name of the card holder and the validity dates on both cards are the same. Because each credit card company (credit card provider) has a different card numbering system, the structure of both credit card numbers vary depending on the credit card company system.

In-order to distinguish the two credit cards ("Main Credit Card" and "Spare Credit Card") from each other, the credit card "Main Credit Card" is named as "Credit Card" and the "Spare Credit Card" is named as "Credit Card-T". This feature also applies to FIGS. 1, 4, 5, 5A and 6.

Figure 13:
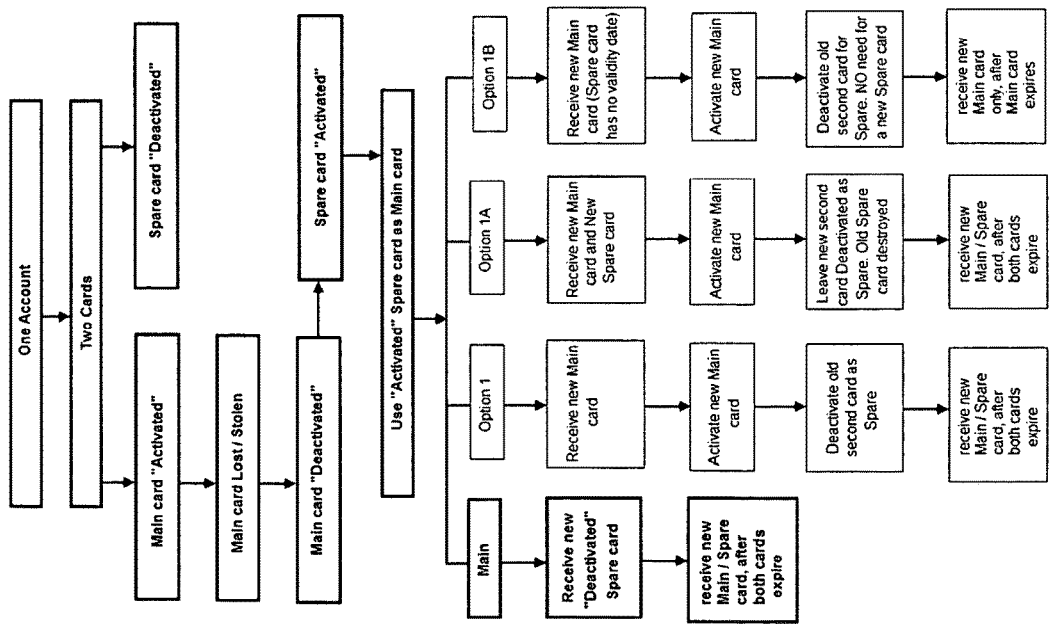
FIG. 13 is a procedural flow chart of the credit card system with options of a single account embodiment.
Figure 14:
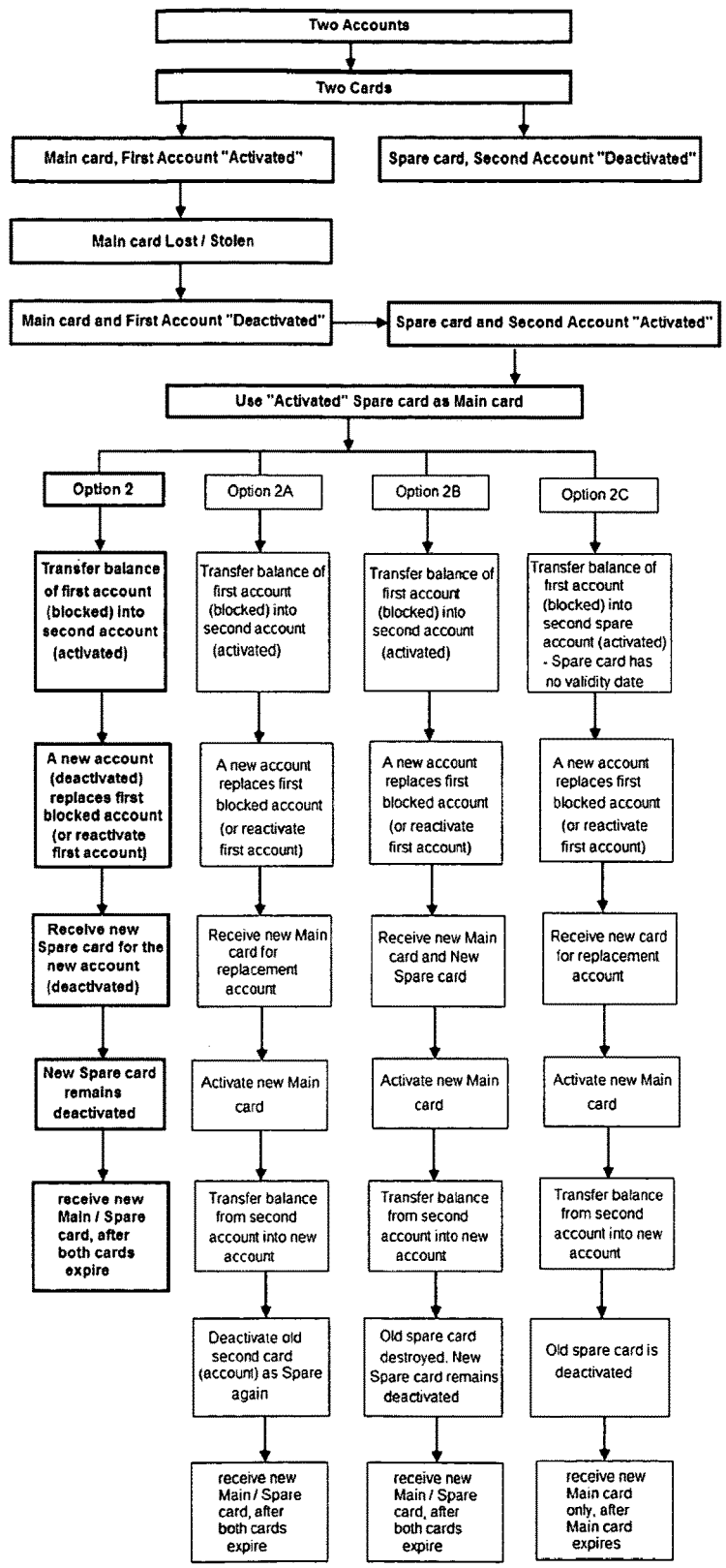
FIG. 14 is a procedural flow chart of the credit card system with options of an embodiment with two accounts.

FIG. 13 and FIG. 14 summarize, in respective flow charts, the system of the present invention as applied to two cards with active main card and deactivated or inactive spare card for a single account and active main card for a first active account and an inactive spare card in a second inactive account. The flow charts of FIGS. 13 and 14 summarize all the above options for issuing of additional cards, with their respective status and account status, as triggered by the loss or theft of an original active main card.

In another embodiment of the present invention, card replacement and automatic expiration dates may be used to effectively improve fraud prevention. This expedient is referred to herein as an "immediate card replacement system".

Fraud Prevention Application of the Immediate Card Replacement System

The Immediate Card Replacement system offers an additional application which can greatly enhance the current fraud protection measures and extend the card usage life span.

Currently the expiration dates of credit cards serve two main purposes:
a. Minimize credit card fraud
b. Minimize credit card wear and tear The Immediate Card Replacement system permits:
a. Reduction of credit/debit card fraud
b. Extension of the usage life span of credit/debit cards, with the following operational expedients:

The operation of the immediate card replacement system comprises:
1. The credit card provider opens one account with two different card numbers:
a. First card number for the "main credit card"
b. Second card number for the "spare credit card"
2. The credit card provider sends two credit cards to the customer:
a. Main credit card, which is activated by the provider upon confirmation of receipt by the customer
b. Spare credit card, remains "deactivated"
3. After a set period of time, such as one year, (the actual time period is set according to the card provider's policy) the credit card provider sends a notice to the customer informing that the spare credit card will be activated and the main credit card will be deactivated at a set time period. This notice is, for example, sent one month prior to the set time period to give the customer sufficient time (this time too can change according to the card provider policy) to call the card provider to confirm the spare card activation and main card deactivation. If the customer fails to call, both cards are deactivated until the customer calls to confirm or acknowledge activation.
4. After receiving the notice, the customer calls the credit card provider to reverse the activation and deactivation of both cards as mentioned above:
a. Main credit card, deactivated, which can now be used as the spare credit card
b. Spare credit card, activated, which can now be used as the main credit card
5. The credit card provider continues this process until both cards expire:
a. Main credit card, expired
b. Spare credit card, expired The Immediate Card Replacement System operatively minimizes card fraud and extends the useful life of the cards thereby facilitating the extension of the credit card expiration period from the normal three years to possibly five to six years.

Real Time Replacement of credit/debit cards in case of fraudulent use
1. The credit card provider opens one account with two different card numbers:
a. First card number for the "main credit card"
b. Second card number for the "spare credit card"
2. The credit card provider sends two credit cards to the customer:
a. Main credit card, which is activated by the provider upon confirmation of receipt by the customer
b. Spare credit card, remains "deactivated"
3. If any suspicious or fraudulent transaction is detected thereafter by the credit card provider, the main credit card will be deactivated.
4. If the transaction is authorized by the customer, then the main credit card is activated again.
5. If the transaction is not authorized by the customer:
a. The spare credit card is activated to be used as the main credit card.
b. The credit card provider then replaces the deactivated credit card (main credit card) with a new number and sends a new credit card (new spare credit card) to the customer. The new credit card (new spare credit card) remains deactivated.

Real Time Replacement for damaged credit/debit cards
1. The credit card provider opens one account with two different card numbers:
a. First card number for the "main credit card"
b. Second card number for the "spare credit card"
2. The credit card provider sends two credit cards to the customer:
a. Main credit card, which is activated by the provider upon confirmation of receipt by the customer
b. Spare credit card, remains "deactivated"

c. If the main credit card is damaged and can not be used, then the credit card provider deactivates the main credit card and activates the spare credit card:

d. The spare credit card is activated to be used as the main credit card.

e. The credit card provider then replaces the deactivated credit card (main credit card) with a new number and sends a new credit card (new spare credit card) to the customer. The new credit card (new spare credit card) remains deactivated.

Benefits of Immediate Card Replacement System:

1. Customer:

a. Peace of mind and convenience that the card holder will never be left without a credit or debit card.

b. Higher protection against fraud.

c. More control over vendor's automatic charges against the credit card in the current e-commerce environment.

2. Credit Card Provider:

a. The Issuer (cardholder's bank) and the Acquirer (merchant bank) and the Card Company will have the assurance that the customer will be in possession of a credit or debit card at all times, which translates into profits for the bank through additional sales.

b. The Issuer will have more protection against credit card fraud, which translates to more profits c. The Issuer can extend the time period for issuing new cards, which translates to cost reduction.

In another embodiment of the present invention, the system is configured for card replacement and the providing of emergency funds on a restricted basis, as may be necessary. This expedient, and the method used in its implementation is referred to herein as an "immediate card replacement system".

Emergency Fund Application Using the Immediate Card Replacement System

The Immediate Card Replacement System is designed to provide an additional application to expeditiously provide immediate access to Emergency Funds at any time. The System is designed to specifically provide Emergency funds, as requested by the card holder in the event of:

a. The card holder having exhausted his/her credit limit and is in need of additional funds b. The cardholder's credit card having been stolen and the credit limit having been fraudulently expended.

Currently even though the credit card holder can request an "instant increase of credit limit" from the credit card provider at any time, there is no guarantee that the requested funds will be approved.

The pre-approved "Emergency Fund" differs from the existing "instant increase of credit limit" with the following pre-set parameters:

a. a preset time limit is established for the usage of Emergency Fund b. a preset time limit is established for the payment of the Emergency fund c. The account is set to divert back to its original credit limit as soon as the Emergency Fund is paid in full.

d. The cardholder needs to meet established qualification terms for the Emergency Fund With the Emergency Fund system, the availability of the additional funds are guaranteed and can always be accessed upon request. Nevertheless, only cardholders who have been "pre-approved" for the Emergency Funds can use this service. A cardholder who has been approved will have "X" percent of his/her credit limit available for Emergency Funds. The "X" percent credit limit for each cardholder will vary depending on his/her credit worthiness. For example, a cardholder with an excellent credit standing can qualify for an Emergency Fund equal to 30% to 40% of his/her credit limit. The "X" percentage rate of the credit limit to be used for the Emergency Fund is determined by the credit card provider, according to its policy.

Benefits:

1. Cardholder:

a. The Cardholder has the peace of mind and convenience that he/she will never be left without a VALID credit or debit card.

b. The Cardholder has the peace of mind and convenience that he/she will have immediate access to Emergency Funds at any time.

c. The Cardholder is protected in case of stolen credit cards when the credit limit has been fraudulently expended, at which point the requested Emergency Fund can be activated.

2. Issuer:

a. The Issuer (cardholder's bank) and the Acquirer (merchant bank) and the Card Company has the assurance that the customer is in possession of a credit or debit card at all times, which translates into profits for the bank through additional sales.

b. The Issuer realizes increased Revenues through annual fees or higher interest rates for supplying additional funds to qualified customers.

c. The required Qualifying term (at time of request) will encourage cardholders to keep their account in good standing at all times and will dramatically reduce Issuer's risk.

Description of Emergency Fund System:

The following description is a preferred method by which the Emergency Fund System is operative with the Immediate Card Replacement system.

1. The credit card provider opens One account with Two different card numbers:

a. First card number for the "Main credit card"

b. Second card number for the "Spare credit card"

2. The credit card provider sends two credit cards to the customer:

a. Main credit card, which is "Activated" by the provider upon confirmation of receipt by the customer b. Spare credit card, remains "Deactivated"

3. The account has an "X" amount of credit line available for spending with the Main credit card. The statements received at the end of each month show the Main credit card number at the top section. The "X" amount of credit line and its interest rate is determined by the credit card provider, according to its policy.

4. The Spare credit card which remains "Deactivated" has "Y" amount of pre-approved credit (Emergency Fund). The "Y" amount of pre-approved credit (Emergency Fund) and its interest rate is determined by the credit card provider, according to its policy 5. Request for Emergency Fund: When the credit card holder makes a request for Emergency Funds, the credit card provider deactivates the Main credit card and activates the Spare credit card. Upon request for Emergency Funds, the customer should confirm the following:

1. If both the Main credit card and Spare credit card are in the customer's possession;

The cardholder calls the phone number on the back of the credit card (main card or spare card)

The cardholder requests the Emergency Fund a) Main credit card, is deactivated, and is used as the Spare credit card b) Spare credit card, is activated, and is used as the Main credit card
2. If only the Spare credit card is in the customer's possession (Main credit card is lost or stolen)
   The cardholder calls the phone number on the back of the Spare credit card.
   The cardholder requests the replacement of the Main credit card
   The cardholder requests the Emergency Fund (in case the credit limit on the Main credit card has been fraudulently expended).
   a) Main credit card, is deactivated, a new Spare credit card is sent to the customer which remains deactivated
   b) Spare credit card, is activated, and is now used as the Main credit card
3. If only the Main credit card is in the customer's possession (e.g., when the cardholder has forgotten to carry the Spare credit card while traveling)
   The cardholder calls the phone number on the back side of the Main credit card.
   The cardholder requests Emergency Funds
5a. Qualifying terms for the Emergency Fund: At the time of a request for the Emergency Funds, the customer's account should be in good standing, despite any pre-approved status and the payment of an annual fee for the Emergency Fund option. For example, the customer should have paid at least the minimum payments of the last three months for the credit card account (parameters of this is determined by the credit card provider, according to its policy).
6. Commencement of availability of Emergency Fund: After activation and deactivation of both cards as mentioned above, the "Y" amount of pre-approved credit (Emergency Fund) is added to the account. The monthly statement now indicates the "Y" amount of pre-approved credit (Emergency Fund) added to the original "X" credit limit. The Spare credit card number which is now used as the Main credit card appears at the top section of the statement.
6a. Time Period for Usage of the available Emergency Fund: If the "Y" amount of pre-approved credit (Emergency funds) is not used after a set period of time (the time period, as determined by the credit card provider, according to its policy) then the account continues with its original "X" amount of credit limit
6b. Sequence of Emergency Fund Usage: Any credit used by the credit card holder will be first applied towards the original "X" credit limit. When the original "X" credit limit is expended then the "Emergency Fund" credit is exercised. Accordingly, the "Emergency Fund" credit can only be used when the original "X" credit limit is fully exhausted.
7. Payment of the Emergency Fund: Any payment made by the credit card holder to the credit card provider will first pay the used portion of the "Y" amount of the pre-approved credit (Emergency Fund).
7a. Time Period for Payment of the Emergency Fund: If the "Y" amount of pre-approved (Emergency Funds) is not paid in full after a set period of time (the time period is determined by the credit card provider, according to its policy) then a penalty or a higher interest rate (the penalty or the interest rate is determined by the credit card provider, according to its policy) is charged to the card holder.
7b. Time Period for Automatic Deactivation of the Emergency Fund: After a set period of time (the time period is determined by the credit card provider, according to its policy) from when the "Y" amount of the credit is paid in full, the account continues with its original "X" amount of credit limit. The original Main credit card remains deactivated and the Spare credit card remains activated to be used as the Main credit card.
8. Repeated Utilization of the Emergency Fund: If the customer needs to use the "Emergency Fund" again, the same process is repeated. The account always reverts to its original "X" credit limit, after the credit card holder pays, in full, the used portion of the "Y" amount of "Emergency Fund" credit line.

Option 1
1. The credit card provider opens TWO accounts with TWO different card numbers:
   a. First account for the "Main credit card"
   b. Second account for the "Spare credit card"
2. The credit card provider sends two credit cards to the customer:
   a. Main credit card, which is activated by the provider upon confirmation of receipt by the customer
   b. Spare credit card, remains "deactivated"
3. The first account has an "X" amount of credit line available for spending with the Main credit card. The statements received at the end of each month show the Main credit card number at the top section. The "X" amount of credit line and its interest rate is determined by the credit card provider, according to its policy.
4. The second account (Spare credit card) which remains "deactivated", has "Y" amount of pre-approved credit (Emergency Funds). The "Y" amount of pre-approved credit (Emergency Funds) and its interest rate is determined by the credit card provider, according to its policy.
5. Request for Emergency Funds: When the credit card holder makes a request for Emergency Funds, the credit card provider deactivates the first account (Main credit card) and transfers the entire account (balance of credit) in the first account (Main credit card) to the second account (Spare credit card) and activates the second account (Spare credit card). Upon request for "Emergency Funds", the credit card holder should confirm the following:
   1) If both the Main credit card and Spare credit card are in the customer's possession;
      The cardholder calls the phone number on the back of the credit card (main card or spare card)
      The cardholder requests the Emergency Fund
      a) First Account (Main credit card), is deactivated, and is used as the Spare credit card
      b) Second Account (Spare credit card), is activated, and is used as the Main credit card
   2. If only the Spare credit card is in the customer's possession (Main credit card is lost or stolen)
      The cardholder calls the phone number on the back of the spare credit card.
      The cardholder requests the replacement of the Main credit card
      The cardholder requests the Emergency Fund (in case the credit limit on the Main credit card has been fraudulently expended).
      a) First Account (Main credit card), is deactivated, a new Spare credit card is sent to the customer which remains deactivated
      b) Second Account (Spare credit card), is activated, and is now used as the Main credit card
   3. If only the Main credit card is in the customer's possession (e.g., when the cardholder has forgotten to carry the Spare credit card while traveling)
      The cardholder calls the phone number on the back side of the Main credit card.
      The cardholder requests Emergency Funds 5a. Qualifying terms for the Emergency Fund: At the time of request for the Emergency Fund, the customer's account should be in good standing, despite any pre-approved status and the payment of an annual fee for the Emergency Fund option. For example, the customer should have paid at least the minimum payments of the last three months for the credit card account (parameters of this are determined by the credit card provider, according to its policy).

6. Commencement of availability of Emergency Funds: After the activation and deactivation of both cards as mentioned above, the "Y" amount of pre-approved credit (Emergency Fund) is added to the account. The monthly statement now indicates the "Y" amount of pre-approved credit (Emergency Fund) added to the original "X" credit limit. The Spare credit card number which is now used as the Main credit card appears at the top section of the statement.

6a. Time Period for Usage of Emergency Funds: If the "Y" amount of pre-approved credit (Emergency funds) is not used after a set period of time (the time period is determined by the credit card provider, according to its policy) then the account will continue with its original "X" amount of credit limit 6b. Sequence of Emergency Funds Usage: Any credit used by the credit card holder is first applied towards the original "X" credit limit. When the original "X" credit limit is expended then the "Emergency Fund" credit is exercised. Therefore, the "Emergency Fund" credit can only be used when the original "X" credit limit is fully exhausted.

7. Payment of Emergency Funds: Any payment made by the credit card holder to the credit card provider first pays the used portion of the "Y" amount of the pre-approved credit (Emergency Fund).

7a. Time Period for payment of Emergency Funds: If the "Y" amount of pre-approved (Emergency Funds) is not paid in full after a set period of time (the time period is determined by the credit card provider, according to its policy) then a penalty or a higher interest rate (the penalty or the interest rate is determined by the credit card provider, according to its policy) is charged to the card holder.

7b. Time period for Automatic Deactivation of Emergency Funds: After a set period of time (the time period is determined by the credit card provider, according to its policy) from when the "Y" amount of the credit is paid in full, the account continues with its original "X" amount of credit limit. The "Y" amount of pre-approved credit (Emergency Funds) is transferred into the second account (Spare credit card). The original Main credit card remains deactivated and the Spare credit card remains activated to be used as the Main credit card.

8. Repeated Utilization of Emergency Funds: If the customer needs to use the "Emergency Funds" again, the same process is repeated. The account always reverts to its original "X" credit limit, after the credit card holder pays in full the used portion of the "Y" amount of "Emergency Fund" credit line.

Option 2

The credit card provider can add the pre-approved (Emergency Fund) to the account without deactivating the Main credit card and activating the Spare credit card.

1. Request for Emergency Funds: When the credit card holder makes a request for Emergency Funds, the credit card provider adds the "Y" amount of pre-approved credit (Emergency Funds) to the account. The monthly statement now indicates the "Y" amount of pre-approved credit (Emergency Funds) added to the original "X" credit limit Upon request for Emergency Funds, the card holder should confirm the following:

The Main credit card is in his/her possession (main credit card not stolen)
   The cardholder calls the phone number on the back of the main credit card.
   The cardholder requests Emergency Funds 1a. Qualifying terms for the Emergency Fund: At the time of request for the Emergency Fund, the customer's account should be in good standing, despite any pre-approved status and the payment of an annual fee for the Emergency Fund option. For example, the customer should have paid at least the minimum payments of the last three months for the credit card account (parameters of this are determined by the credit card provider, according to its policy).

1b. Time Period for Usage of Emergency Funds: If the "Y" amount of pre-approved credit (Emergency funds) is not used after a set period of time (the time period is determined by the credit card provider, according to its policy) then the account continues with its original "X" amount of credit limit 1c. Sequence of Emergency Fund Usage: Any credit used by the credit card holder is first applied towards the original "X" credit limit. When the original "X" credit limit is expended then the "Emergency Fund" credit is exercised. Therefore, the "Emergency Fund" credit can only be used when the original "X" credit limit is fully exhausted.

2. Payment of Emergency Funds: Any payment made by the credit card holder to the credit card provider first pays the used portion of the "Y" amount of the pre-approved credit (Emergency Funds).

2a. Time period for payment of Emergency Funds: If the "Y" amount of pre-approved (Emergency Funds) is not paid in full after a set period of time (the time period is determined by the credit card provider, according to its policy) then a penalty or a higher interest rate (the penalty or the interest rate is determined by the credit card provider, according to its policy) is charged to the card holder.

2b. Time Period for Automatic Deactivation of Emergency Funds: After a set period of time (the time period is determined by the credit card provider, according to its policy) from when the "Y" amount of the credit is paid in full, the account continues with its original "X" amount of credit limit.

3. Repeated Utilization of Emergency Funds: If the card holder needs to use the "Emergency Funds" again, the same process is repeated and the account reverts back to its original credit limit after the customer pays the full amount of the Emergency Funds.

This latter option is not recommended, since it can increase chances of fraud. If the credit card is lost or stolen the thief may have access to all personal information of the cardholder and can answer all the security questions asked from the credit car provider to add the Emergency Fund and use the entire amount (Emergency Fund). With the activation and deactivation of both cards, chances of fraud is reduced almost to zero, since, in order to use the Emergency Fund, the cardholder has to provide all the information on the Spare credit card, which is kept in a separate and safe place.

Option 3

For the utilization of the Emergency Fund option of the present invention, the credit card provider can add the pre-approved (Emergency Fund) to the account with a single card, without the necessity of having a Spare credit card. The procedure involved in using the single card option is as follows:

1. The credit card provider opens One account with two credit lines:
   a) Main credit line for the "credit card"
   b) Second credit line for the "Emergency fund"

2. The credit card provider sends the credit card to the customer:
a) The credit card with the "main credit line" is activated by the provider upon confirmation of receipt by the customer
b) Secondary credit line, remains "deactivated"
3. The credit card has an "X" amount of credit line (main credit line) available for spending. The statements received at the end of each month show the credit card number at the top section. The "X" amount of credit line and its interest rate is determined by the credit card provider, according to their policy.
4. The secondary credit line which remains "deactivated", has "Y" amount of pre-approved credit (Emergency Funds). The "Y" amount of pre-approved credit (Emergency Funds) and its interest rate is determined by the credit card provider, according to their policy.
5. Request for Emergency Fund: When the credit card holder makes a request for Emergency Funds, the credit card provider adds the "Y" amount of pre-approved credit (Emergency Funds) to the account. The monthly statement then indicates the "Y" amount of pre-approved credit (Emergency Funds) added to the original "X" credit limit Upon request for Emergency Funds, the card holder confirms the following:
The credit card is in his/her possession (credit card not stolen)
   The cardholder calls the phone number on the back side of the main credit card.
   The cardholder requests for Emergency Fund
5a. Qualifying terms for the Emergency Fund: At the time of request for the Emergency Fund, the customer's account should be in good standing, despite his/her pre-approved status and the payment of their annual fee. For example, the customer should have paid at least the minimum payments of the last three months (this will be determined by the credit card provider, according to their policy).
5b. Time Period for Usage of Emergency Funds: If the "Y" amount of pre-approved credit (Emergency funds) is not used after a set period of time (the time period is determined by the credit card provider, according to their policy) then the account will continue with its original "X" amount of credit limit.
5c. Sequence of Emergency Fund Usage: Any credit used by the credit card holder is first applied towards the original "X" credit limit. When the original "X" credit limit is expended then the "Emergency Fund" credit is exercised. Therefore the "Emergency Fund" credit can only be used when the original "X" credit limit is fully exhausted.
6. Payment of Emergency Funds: Any payment made by the credit card holder to the credit card provider is first applied to pay the used portion of the "Y" amount of the pre-approved credit (Emergency Funds).
6a. Time period for payment of Emergency Funds: If the "Y" amount of pre-approved (Emergency Funds) is not paid in full after a set period of time (the time period is determined by the credit card provider, according to their policy) then a penalty or a higher interest rate (the penalty or the interest rate is determined by the credit card provider, according to their policy) is charged to the card holder.
6b. Time Period for Automatic Deactivation of Emergency Funds: After a set period of time (the time period is determined by the credit card provider, according to their policy) from when the "Y" amount of the credit is paid in full, the account continues with its original "X" amount of credit limit
7. Repeated Utilization of Emergency Funds: If the card holder needs to use the "Emergency Funds" again, the same process is repeated and the account reverts to its original credit limit after the customer pays the full amount of the Emergency Funds.
Option 4
The credit card provider can add the pre-approved (Emergency Fund) to the account without using the Spare credit card.
1. The credit card provider opens Two accounts with two different credit lines:
a) First account for the Main credit line
b) Second account for the Second credit line (Emergency fund)
2. The credit card provider sends the credit card to the customer:
a) The first account (credit card) with the "main credit line" is activated by the provider upon confirmation of receipt by the customer
b) The second account with the Secondary credit line, remains "deactivated"
3. The first account (credit card) has an "X" amount of credit line (main credit line) available for spending. The statements received at the end of each month show the credit card number at the top section. The "X" amount of credit line and its interest rate is determined by the credit card provider, according to their policy.
4. The second account (secondary credit line) which remains "deactivated", has "Y" amount of pre-approved credit (Emergency Funds). The "Y" amount of pre-approved credit (Emergency Funds) and its interest rate is determined by the credit card provider, according to their policy.
5. Request for Emergency Fund: When the credit card holder makes a request for Emergency Funds, the credit card provider adds the "Y" amount of pre-approved credit (Emergency Funds) to the account. The monthly statement indicates the "Y" amount of pre-approved credit (Emergency Funds) added to the original "X" credit limit Upon request for Emergency Funds, the card holder should confirm the following:
The credit card is in his/her possession (credit card not stolen)
   The cardholder calls the phone number on the back side of the main credit card.
   The cardholder requests for Emergency Fund
5a. Qualifying terms for the Emergency Fund: At the time of request for the Emergency Fund, the customer's account must be in good standing, despite their pre-approved status and the payment of their annual fee. For example, the customer must have paid at least the minimum payments of the last three months (this will be determined by the credit card provider, according to their policy).
5b. Time Period for Usage of Emergency Funds: If the "Y" amount of pre-approved credit (Emergency funds) is not used after a set period of time (the time period is determined by the credit card provider, according to their policy) then the account continues with its original "X" amount of credit limit
5c. Sequence of Emergency Fund Usage: Any credit used by the credit card holder is first applied towards the original "X" credit limit. When the original "X" credit limit is expended then the "Emergency Fund" credit is exercised. Therefore the "Emergency Fund" credit can only be used when the original "X" credit limit is fully exhausted.
6. Payment of Emergency Funds: Any payment made by the credit card holder to the credit card provider is first applied to pay the used portion of the "Y" amount of the pre-approved credit (Emergency Funds).

6a. Time period for payment of Emergency Funds: If the "Y" amount of pre-approved (Emergency Funds) is not paid in full after a set period of time (the time period is determined by the credit card provider, according to their policy) then a penalty or a higher interest rate (the penalty or the interest rate is determined by the credit card provider, according to their policy) is charged to the card holder.

6b. Time Period for Automatic Deactivation of Emergency Funds: After a set period of time (the time period is determined by the credit card provider, according to their policy) from when the "Y" amount of the credit is paid in full, the account continues with its original "X" amount of credit limit 7. Repeated Utilization of Emergency Funds: If the card holder needs to use the "Emergency Funds" again, the same process is repeated and the account reverts to its original credit limit after the customer pays the full amount of the Emergency Funds.

While the foregoing description makes reference to particular illustrative embodiments, these examples should not be construed as limitations and the present invention is not limited to details of the disclosed embodiments.

What is claimed is:

1. A method of selectively immediately providing emergency cash or transaction payment funds from one of an ATM machine and a credit card reader respectively, with the use of multiple credit card embodiments in a multiple credit card embodiment system, the method comprising the steps of:
   a) a single financial institution credit card provider issuing to a single individual two credit card embodiments with two different card numbers, with opening of a single account with the two different card numbers and with each credit card embodiment being computer readable, with the two credit card embodiments both being directly linked to the single account,
   b) the single financial institution credit card provider designating a first credit card number for a main credit card embodiment with access only to a main credit line within the single account and making available the second card number for a secondary credit card embodiment, the secondary credit card embodiment having access only to a secondary credit line, within the single account, as an emergency available fund directly associated therewith, the secondary credit line comprising a predetermined percentage of the main credit line with the main and secondary credit lines being directly in the single account but configured for separate use by the main and secondary credit card embodiments respectively,
   c) the single financial institution credit card provider providing the main credit card embodiment and the secondary credit card embodiment being available, to the single individual, with the main credit card embodiment being activated with authorized verification and provided with a PIN to enable the main credit card embodiment, by entry of the PIN, to interact, with at least one of the ATM, for the disbursement of cash and the credit card reader for authorized payment of a sales transaction; the main credit card embodiment being activated only by the single financial institution credit card provider upon authorized confirmation of receipt thereof by the single individual, with the secondary credit card embodiment being unactivatable for said interaction, at all times while the main credit card embodiment is fully active for said interaction,
   d) when a main credit card credit limit is insufficient, for lack of funds, for a transaction with the ATM or credit card reader, the single individual is immediately advised of the insufficiency and the amount thereof, and with the single individual being aware of the amount of available emergency funds for use and only upon specific single individual's explicit request to the single financial institution credit card provider, and upon the single individual meeting pre-determined qualifying terms, the main credit card embodiment is deactivated only by the single financial institution credit card provider from effective transaction use and the secondary credit card embodiment, with the secondary credit line is activated only by the single financial institution credit card provider to be effectively used as the main credit card embodiment for disbursement of emergency cash or transaction payment with the following conditions:
      i. access to the emergency fund available in the secondary credit line by the secondary credit card embodiment is allowable at all times upon activation triggered by the single individual
      ii. usage of the emergency fund associated with the secondary credit card embodiment is available only for a pre-determined limited time and only after the main credit line has insufficient funds for effecting a transaction, and wherein if funds associated with the secondary credit line are not used within the pre-determined limited time, the secondary credit line is automatically deactivated and if partial funds are used within the pre-determined usage time, the second credit card line associated with the remainder of the emergency fund is deactivated,
      iii. payments made to the single financial institution credit card provider are first applied towards payment for amounts expended in the emergency fund within a predetermined limited time allowed for the payment of the emergency fund whereby penalty charges are not accrued, and
      iv. the emergency fund is automatically deactivated once the appropriate payment is made and the main credit line reverts to its original credit limit where the original secondary credit card embodiment remains activated to be used as a main credit card embodiment and the original main credit card embodiment remains deactivated from use,
   e) the steps in paragraph (d) are repeated multiple times, as necessary, and as sanctioned by the single financial institution credit card provider,
   wherein the ATM or credit card reader is configured to read the computer readable credit card embodiment, to:
   a) electronically access the single account to verify active status of the single account for completion of a normal transaction, and
   b) characterized in that, with the existence of the main and secondary credit card embodiments, the ATM or credit card reader is further configured to additionally identify the specific main or secondary credit card embodiment, in the single account, being used, and
   c) further identify real-time validity status of the card embodiment being used as being active or inactive with one of the main or emergency lines of credit and which of the main or emergency lines of credit is active for effective use, and
   d) if the computer read card embodiment is active for the identified active line of credit, to complete a transaction via at least one of the main or emergency lines of credit.

2. A method of selectively activating an ATM machine to immediately provide emergency cash or to selectively activate a credit card reader to validate emergency transaction payment funds with a single credit card system, the method comprising the steps of:
- a) a single financial institution credit card provider issuing to a single individual one credit card embodiment with the opening of two different accounts operatively linked to the single credit card embodiment,
- b) the single financial institution credit card provider designating a first of the different accounts for a main credit line and designating the second of the different accounts as having a secondary credit line as an emergency available fund, the secondary credit line comprising a predetermined percentage of the main credit line,
- c) the single financial institution credit card provider sending a single credit card embodiment to the single individual, with the credit card embodiment being computer readable and separately selectively linked to both accounts and the respective main credit line and secondary credit line in the two accounts, the credit card embodiment being activated with authorized verification and provided with a PIN to enable the credit card embodiment, by entry of the PIN, to interact, with at least one of the ATM, for the disbursement of cash and the credit card reader for authorized payment of a sales transaction; the credit card embodiment being activated for the main credit line and account associated thereto, only by the single financial institution credit card provider upon authorized confirmation of receipt thereof by the single individual, with the secondary credit line remaining inactivated for use with the card embodiment and being blocked from being activated and used by the credit card embodiment for said interaction, at all times while the main credit line is fully active for said interaction, whereby the main and secondary credit lines are never able to be actively accessed at the same time except under the following conditions:
- d) when a credit card credit limit for the main credit line is insufficient for lack of funds, for a transaction, the customer is immediately advised of the insufficiency and the amount thereof, and with the single individual being aware of the amount of available emergency funds for use and only upon the customer's, specific explicit request to the single financial institution credit card provider, and upon single individual meeting pre-determined qualifying terms, the secondary credit line is activated only by the single financial institution credit card provider to be used by the credit card holder, with any funds remaining in the main credit line and with the following conditions:
  - i. access by the credit card embodiment to the emergency fund available in the secondary credit line is allowable at all times upon activation triggered by the card embodiment holder;
  - ii. usage of the emergency fund in the secondary credit line is available by the credit card embodiment holder only for a pre-determined limited time and only after the main credit line is insufficient to effect a transaction, wherein, if funds associated with the secondary credit line are not used within the pre-determined limited time, the secondary credit line is automatically deactivated and if partial funds are used within the pre-determined usage time, the second credit card line associated with the remainder of the emergency fund is deactivated;
  - iii. payments made to the credit card provider are first applied towards payment for amounts expended in the emergency fund within a predetermined limited time allowed for the payment of the emergency fund whereby penalty charges are not accrued;
  - iv. the emergency fund is automatically deactivated for use with the credit card embodiment once the appropriate payment is made and the main credit line reverts to its original credit limit and the secondary credit line is deactivated; and
- e) the steps in paragraph (d) are repeated multiple times, as necessary and as sanctioned by the single financial institution credit card provider;

wherein the computer readable credit card embodiment is configured to enable the ATM or credit card reader to:
- a) electronically access both of said accounts and to identify which of the two accounts has a real-time validity status, depending on which account is currently active, with the other being inactive with respect to the main and secondary lines of credit,
- b) wherein the ATM or credit card reader is configured to inquire of the computer readable element to identify the specific account and line of credit which is currently active to effect a transaction, and if the card embodiment is active for the active line of credit, to complete a transaction from the main or second line of credit or a combination from both lines of credit.

3. A method of selectively activating an ATM machine for a customer to obtain emergency cash therefrom or to selectively effect an emergency credit card sales transaction of fund payments with a credit card reader, by means of remote switching activation capability between two credit card embodiments, in a situation when a credit card credit limit has been expended and a first of the two credit card embodiments is not able to be used with the ATM or credit card reader, for insufficient funds, the method comprising the prophylactic preliminary steps of:
- a) a credit card provider issuing to the customer two credit card embodiments with two different card numbers, and with each being computer readable, with opening of a single account with the two different card numbers, with the two credit card embodiments both being directly linked to the single account, the single account being separated into main and emergency credit lines;
- b) the credit card provider designating a first credit card number for a main credit card embodiment with access only to the main credit line within the single account and designating the second card number for a secondary credit card embodiment for the single account, the secondary credit card embodiment having access only to the secondary credit line within the single account as an emergency available fund, the secondary credit line comprising a predetermined percentage of the main credit line with the main and secondary credit lines being linked in the single account but configured for separate use by the main and secondary credit card embodiments respectively,
- c) the credit card provider providing the main credit card embodiment and making available and designating the secondary credit card embodiment, to the customer, with the main credit card embodiment being activated with authorized verification and provided with a PIN to enable the main credit card embodiment to interact, with at least one of an ATM and-with a credit card reader only up to a specifically designated main credit card limit;

d) activating the main credit card embodiment for effective use only by the credit card provider, upon authorized confirmation of receipt of the main card embodiment by the customer, with the secondary credit card embodiment being unactivatable for said effective use for a transaction from the emergency credit line, at all times while the main credit card embodiment is active for said interaction, whereby the main and secondary credit card embodiments are never able to be active at the same time except under the following conditions and with the following step, when the emergency funds are required:

e) when there are insufficient funds in the account to effect a transaction, and wherein the customer is immediately advised of the insufficiency of funds and the amount thereof and with the single individual being aware of the amount of available emergency funds for use and only upon a specific customer's explicit request to the credit card provider, and upon the customer meeting pre-determined qualifying terms, the main credit card embodiment is deactivated only by the credit card provider from effective use and with the secondary credit card embodiment then being activated only by the credit card provider to be used as the main credit card embodiment for a predetermined limited period of time for access only to the emergency funds available in the secondary credit line to provide emergency cash or emergency payment, wherein usage of the emergency fund associated with the secondary credit card is available only for a pre-determined limited time and only if the main credit line has insufficient funds for a transaction, wherein the ATM or credit card reader is configured to read the computer readable credit card embodiment and to:

a) electronically access the single account to verify active status of the single account for completion of a normal transaction, and b) characterized in that, with the existence of the main and secondary credit card embodiments, the ATM or credit card reader is further configured to additionally identify the main or secondary credit card embodiments, in the single account, being used, and c) further identifying real-time validity status of the card embodiment as being active or inactive with one of the main or emergency lines of credit and which of the main or emergency lines of credit is active for effective use, and d) if the computer read card embodiment is active for the identified active line of credit to complete a transaction via at least one of the main or emergency line of credit.

4. The method of claim 3, wherein payments made to the single financial institution credit card provider for use of the main and secondary card embodiments or the single card embodiment are first applied towards payment for amounts expended in the emergency fund within a predetermined limited time allowed for the payment of the emergency fund whereby penalty charges are not accrued.

5. The method of claim 3, wherein the emergency fund is automatically deactivated once the appropriate payment is made and the main credit line reverts to the original credit line limit and with the two credit card with two different card numbers having been provided, the main credit card embodiment which is active for use is activated for use and the spare credit card embodiment is deactivated for use.

6. The method of claim 3, wherein the steps in paragraphs b and c respectively, as applicable, are repeated multiple times, as necessary and as sanctioned by the single financial institution credit card provider.

7. A method of selectively immediately providing cash or transaction payment funds from one of an ATM machine and a credit card reader respectively, with the use of multiple credit card embodiments in a multiple credit card embodiment system, the method comprising the steps of:

a) a single financial institution credit card provider issuing to a single individual two credit card embodiments with two different card numbers, with opening of a single account with the two different card numbers and with each credit card embodiment being computer readable, with the two credit card embodiments both being directly linked to the single account, b) the single financial institution credit card provider providing the main credit card embodiment and the secondary credit card embodiment being available, to the single individual, with the main credit card embodiment being activated with authorized verification and provided with a PIN to enable the main credit card embodiment, by entry of the PIN, to interact, with at least one of the ATM, for the disbursement of cash and the credit card reader for authorized payment of a sales transaction; the main credit card embodiment being activated only by the single financial institution credit card provider upon authorized confirmation of receipt thereof by the single individual, with the secondary credit card embodiment being unactivatable for said interaction, at all times while the main credit card embodiment is fully active for said interaction, c) the single financial institution credit card provider designating a first credit card number for a main credit card embodiment with access only to a main credit line within the single account and making available the second card number for a secondary credit card embodiment, the secondary credit card embodiment having access to the main or secondary credit line, within the single account, as an emergency available fund directly associated therewith, the secondary credit line comprising a predetermined percentage of the main credit line with the main and secondary credit lines being directly in the single account but configured for separate use by the main and secondary credit card embodiments respectively, wherein, when a main credit card credit limit is insufficient, for lack of funds, for a transaction with the ATM or credit card reader, the single individual is immediately advised of the insufficiency and the amount thereof, and with the single individual being aware of the amount of available emergency funds for use and only upon specific single individual's explicit request to the single financial institution credit card provider, and upon the single individual meeting pre-determined qualifying terms, the main credit card embodiment is deactivated only by the single financial institution credit card provider from effective transaction use and the secondary credit card embodiment, with the secondary credit line is activated only by the single financial institution credit card provider to be effectively used as the main credit card embodiment for disbursement of emergency cash or transaction payment with the following conditions:

i. access to the emergency fund available in the secondary credit line by the secondary credit card embodiment is allowable at all times upon activation triggered by the single individual ii. usage of the emergency fund associated with the secondary credit card embodiment is available only for a pre-determined limited time and only after the main credit line has insufficient funds for effecting a transaction, and wherein if funds associated with the secondary credit line are not used within the pre-determined limited time, the secondary credit line is automatically deactivated and if partial funds are used within the pre-determined usage time, the second credit card line associated with the remainder of the emergency fund is deactivated, iii. payments made to the single financial institution credit card provider are first applied towards payment for amounts expended in the emergency fund within a predetermined limited time allowed for the payment of the emergency fund whereby penalty charges are not accrued, and iv. the emergency fund is automatically deactivated once the appropriate payment is made and the main credit line reverts to its original credit limit where the original secondary credit card embodiment remains activated to be used as a main credit card embodiment and the original main credit card embodiment remains deactivated from use, d) the steps in paragraph c) are repeated multiple times, as necessary, and as sanctioned by the single financial institution credit card provider, e) alternatively, wherein only a single credit line is established for the single account and the single individual becomes aware of the absence of the main credit card embodiment by reason of theft, loss or damage, the single individual being aware of said absence advises the single financial institution of the absence and the main credit card embodiment is deactivated only by the single financial institution credit card provider from effective transaction use and the secondary credit card embodiment, is immediately activated only by the single financial institution credit card provider to be effectively used as the main credit card embodiment for disbursement of cash or transaction payment, f) the steps in paragraph (e) are repeated multiple times, as necessary, and as sanctioned by the single financial institution credit card provider;

wherein the ATM or credit card reader is configured to read the computer readable credit card embodiment, to:

a. electronically access the single account to verify active status of the single account for completion of a normal transaction, and b. characterized in that, with the existence of the main and secondary credit card embodiments, the ATM or credit card reader is further configured to additionally identify the specific main or secondary credit card embodiment, in the single account, being used, and c. further identify real-time validity status of the card embodiment being used as being active or inactive with one of the single credit line or with main and emergency lines of credit, which of the main or emergency lines of credit is active for effective use, and d. if the computer read card embodiment is active for the single line of credit or identified active line of credit, to complete a transaction via at least one of the single line of credit or main or emergency lines of credit.

8. The method of claim 7 wherein, with an established single credit line as in paragraph e), and with activation of the secondary credit card embodiment as the main credit card embodiment, the single financial institution credit card provider makes available to the single individual a new secondary credit card embodiment.

* * * * *

UNITED STATES PATENT AND TRADEMARK OFFICE
CERTIFICATE OF CORRECTION

PATENT NO. : 9,646,450 B2
APPLICATION NO. : 12/725194
DATED : May 9, 2017
INVENTOR(S) : Stefan Melik-Aslanian and Linda Aslanian It is certified that error appears in the above-identified patent and that said Letters Patent is hereby corrected as shown below:

In Claim 1
Column 37
Line 31: delete "financial institution"
      replace "issuing" with "providing"
Line 34: replace "account" with "fund disbursement source"
Line 37: replace "account" with "fund disbursement source"
Line 38: delete "financial institution"
Line 41: replace "account" with "fund disbursement source"
Line 45: replace "account" with "fund disbursement source"
Line 46: delete "the secondary credit line comp"
Line 47: delete "rising a predetermined percentage of the main credit"
Line 48: delete "line"
Line 49: replace "account" with "fund disbursement source"
Line 52: delete "financial institution"
Line 56: delete "with authorized verification"
Line 62: delete "only by the single financial institution credit"
Line 63: delete "card provider upon authorized confirmation of receipt"
Line 64: delete "thereof"

Column 38
Line 1: replace "insufficient" with "inadequate"
Line 3: delete "the single individual is immediately"
Line 4: delete "advised of the insufficiency and the amount thereof, and"
Line 5: delete "with the single individual being aware of the amount of"
Line 6: delete "available emergency funds for use and only upon"
Line 7: delete "specific single individual's explicit request to the single"
Line 8: delete "single financial institution credit card provider, and upon the"
Line 9: delete "single individual meeting pre-determined qualifying"
Line 10: delete "terms"

Signed and Sealed this
Eighth Day of May, 2018

Andrei Iancu
*Director of the United States Patent and Trademark Office*

CERTIFICATE OF CORRECTION (continued)
U.S. Pat. No. 9,646,450 B2

Line 11: delete "only by the single financial institution credit card"
Line 12: delete "provider"
Line 14: delete "only by the single financial institution"
Line 15: delete "credit card provider"
Line 24: delete "only"
Line 25: delete "and only after the"
Line 26: delete "main credit line has insufficient funds for effecting a"
Line 27: delete "transaction"
Delete Lines 34 through 46
Line 48: delete "financial"
Line 49: delete "institution"
Line 52: replace "account" with "fund disbursement source"
Line 53: replace "account" with "fund disbursement source"
Line 59: replace "account" with "fund disbursement source"

In Claim 2
Column 39
Line 6: delete "financial institution"
      replace "issuing" with "providing"
Line 8: replace "account" with "fund disbursement source"
Line 10: delete "financial institution"
Line 11: replace "account" with "fund disbursement source"
Line 13: replace "account" with "fund disbursement source"
Line 14: delete "the secondary credit line com"
Line 15: delete "comprising a predetermined percentage of the main credit"
Line 16: delete "line,"
Line 17: delete "financial institution"
Line 18: replace "sending" with "providing"
Line 22: replace "account" with "fund disbursement source"
Line 52: delete "credit card provider"
Line 62: delete "only after the main credit line is insufficient to effect"
Line 63: delete "a transaction"

Column 40
Delete Lines 3 through 12
Line 15: delete "financial"
Line 16: delete "institution"
Line 19: replace "account" with "fund disbursement source"
Line 20: replace "account" with "fund disbursement source"
Line 21: replace "account" with "fund disbursement source"
Line 26: replace "account" with "fund disbursement source"
Line 27: delete "only by the credit card provider"

CERTIFICATE OF CORRECTION (continued)

U.S. Pat. No. 9,646,450 B2

In Claim 3
Column 40
Line 40: delete "for insufficient funds"
Line 42: replace "issuing" with "providing"
Line 44: replace "account" with "fund disbursement source"
Line 45: replace "account" with "fund disbursement source"
Line 47: replace "account" with "fund disbursement source"
       replace "account" with "fund disbursement source"
Line 51: replace "account" with "fund disbursement source"
Line 53: replace "account" with "fund disbursement source"
Line 55: replace "account" with "fund disbursement source"
Line 56: delete "the secondary credit line"
Line 57: delete "comprising a predetermined percentage of the main"
Line 58: delete "credit line"
Line 59: replace "account" with "fund disbursement source"

Column 41
Line 2: delete "only up to a specifically designated main credit"
Line 3: delete "credit card limit"
Line 5: delete "only by the credit card provider, upon"
Line 6: delete "authorized confirmation of receipt of the main card"
Line 7: delete "embodiment by the customer"
Line 16: replace "insufficient" with "inadequate"
       replace "account" with "fund disbursement source"
Line 17: delete "the customer is"
Line 18: delete "immediately advised of the insufficiency of funds"
Line 19: delete "and the amount thereof and with the single individual"
Line 20: delete "being aware of the amount of available emergency"
Line 21: delete "emergency funds for use and only upon a specific customer's"
Line 22: delete "explicit request to the credit card provider, and upon"
Line 23: delete "the customer meeting pre-determined qualifying"
Line 24: delete "terms"
Line 25: delete "only by the credit card provider"
Line 28: delete "for a"
Line 29: delete "pre-determined limited time"
Line 34: delete "only for a pre-determined limited time and only if the"
Line 35: delete "main credit line has insufficient funds"
Line 40: replace "account" with "fund disbursement source"
Line 41: replace "account" with "fund disbursement source"
Line 47: replace "account" with "fund disbursement source"
Line 58: delete "financial institution"

In Claim 7
Column 42
Line 13: delete "financial institution"
       replace "issuing" with "providing"
Line 17: replace "account" with "fund disbursement source"
Line 19: replace "account" with "fund disbursement source"
Line 21: delete "financial institution"
Line 31: delete "only by the single financial institution credit"
Line 32: delete "card provider upon authorized confirmation of receipt"
Line 33: delete "thereof"
Line 37: delete "financial institution"
Line 40: replace "account" with "fund disbursement source"
Line 44: replace "account" with "fund disbursement source"
Line 45: delete "the secondary credit"
Line 46: delete "credit line comprising a predetermined percentage of the main"
Line 47: delete "credit line"
Line 48: replace "account" with "fund disbursement source"
Line 52: delete "the"
Line 53: delete "single individual is immediately advised of the insuf"
Line 54: delete "ficiency and the amount thereof, and with the single"
Line 55: delete "individual being aware of the amount of available"
Line 56: delete "emergency funds for use and only upon specific single"
Line 57: delete "individual's explicit request to the single financial"
Line 58: delete "institution credit card provider, and upon the single"
Line 59: delete "individual meeting pre-determined qualifying terms"
Line 60: delete "only by"
Line 61: delete "the single financial institution credit card provider"
Line 64: delete "only by the single financial institution credit card"
Line 65: delete "provider"

Column 43
Delete Lines 5 through 28
Line 30: delete "financial"
Line 31: delete "institution"
Line 33: replace "account" with "fund disbursement source"
Line 37: replace "financial institution" with "credit card provider"
Line 40: delete "only by the financial institution credit card"

Column 44
Line 1: delete "provider"
Line 3: delete "only by the single financial institution credit card"
Line 4: delete "provider"
Line 8: delete "financial"
Line 9: delete "institution"

CERTIFICATE OF CORRECTION (continued)
U.S. Pat. No. 9,646,450 B2

Line 12: replace "account" with "fund disbursement source"
Line 13: replace "account" with "fund disbursement source"
Line 20: replace "account" with "fund disbursement source"

In Claim 8
Column 44
Line 36: delete "financial institution"

UNITED STATES PATENT AND TRADEMARK OFFICE
CERTIFICATE OF CORRECTION

PATENT NO. : 9,646,450 B2
APPLICATION NO. : 12/725194
DATED : May 9, 2017
INVENTOR(S) : Stefan Melik-Aslanian and Linda Aslanian Page 1 of 1

It is certified that error appears in the above-identified patent and that said Letters Patent is hereby corrected as shown below:

Claim 2:
Column 39
Line 23: replace "account" with "fund disbursement source"
Line 30: replace "account" with "fund disbursement source"
Line 31: delete "only by the single financial institution"
Line 32: delete "credit card provider upon authorized confirmation of"
Line 33: delete "receipt thereof"
Line 43: replace "insufficient" with "inadequate"
Line 43: delete "the"
Line 44: delete "customer is immediately advised of the insufficiency"
Line 45: delete "and the amount thereof, and with the single individual"
Line 46: delete "being aware of the amount of available emergency"
Line 47: delete "funds for use and only upon the customer's, specific"
Line 48: delete "explicit request to the single financial institution credit"
Line 49: delete "card provider, and upon single individual meeting"
Line 50: delete "pre-determined qualifying terms,"
Line 51: delete "only by the single financial institution"

Signed and Sealed this
Seventh Day of April, 2020

Andrei Iancu
*Director of the United States Patent and Trademark Office*